US011895456B2

(12) United States Patent
Jorgovanovic et al.

(10) Patent No.: US 11,895,456 B2
(45) Date of Patent: *Feb. 6, 2024

(54) SHARING AUDIO FROM A SOURCE DEVICE

(71) Applicant: Amazon Technologies, Inc., Seattle, WA (US)

(72) Inventors: Milos Jorgovanovic, Mountain View, CA (US); Ganesha Batta, Pleasanton, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/876,148

(22) Filed: Jul. 28, 2022

(65) Prior Publication Data

US 2022/0369022 A1 Nov. 17, 2022

Related U.S. Application Data

(63) Continuation of application No. 17/217,201, filed on Mar. 30, 2021, now Pat. No. 11,438,688.

(60) Provisional application No. 63/120,563, filed on Dec. 2, 2020.

(51) Int. Cl.
*H04R 1/10* (2006.01)

(52) U.S. Cl.
CPC ......... *H04R 1/1041* (2013.01); *H04R 1/1016* (2013.01); *H04R 2420/07* (2013.01)

(58) Field of Classification Search
CPC ..................... H04R 1/1041; H04R 1/1016
See application file for complete search history.

(56) References Cited

U.S. PATENT DOCUMENTS

| 10,542,574 | B1 | 1/2020 | Jorgovanovic et al. |
| 10,917,930 | B2* | 2/2021 | Morris ................. H04W 76/15 |
| 11,153,678 | B1 | 10/2021 | Jorgovanovic et al. |
| 2008/0090524 | A1 | 4/2008 | Lee et al. |
| 2009/0109894 | A1 | 4/2009 | Ueda et al. |
| 2011/0188665 | A1 | 8/2011 | Burge et al. |
| 2014/0161274 | A1 | 6/2014 | Singamsetty et al. |
| 2017/0019198 | A1 | 1/2017 | Rajapakse et al. |
| 2018/0014109 | A1 | 1/2018 | Boesen |
| 2018/0227679 | A1 | 8/2018 | Ungstrup et al. |
| 2019/0052984 | A1 | 2/2019 | Hariharan et al. |
| 2019/0174557 | A1 | 6/2019 | Ueda et al. |
| 2020/0120727 | A1* | 4/2020 | Batta ................. H04W 76/14 |
| 2020/0322788 | A1 | 10/2020 | Batra et al. |
| 2021/0076435 | A1* | 3/2021 | Cheong ............... H04W 76/14 |

(Continued)

OTHER PUBLICATIONS

The International Search Report and Written Opinion for PCT Application No. PCT/US21/60999, dated Feb. 25, 2022.

*Primary Examiner* — Simon King
(74) *Attorney, Agent, or Firm* — Lee & Hayes P.C.

(57) ABSTRACT

In various examples, audio received from a source device is shared from a first wireless earbud to one or more other wireless earbuds. For example, source-device settings are shared by the first wireless earbud with the one or more other wireless earbuds to facilitate synchronization and passive receipt of data transmitted by the source device. Once the wireless earbuds are synchronized, they may check in with one another in a coordinated manner to share packets that were missed when passively listening to the source device.

20 Claims, 14 Drawing Sheets

(56) References Cited

U.S. PATENT DOCUMENTS

2021/0160697 A1 5/2021 Zheng et al.
2022/0174392 A1 6/2022 Jorgovanovic et al.

* cited by examiner

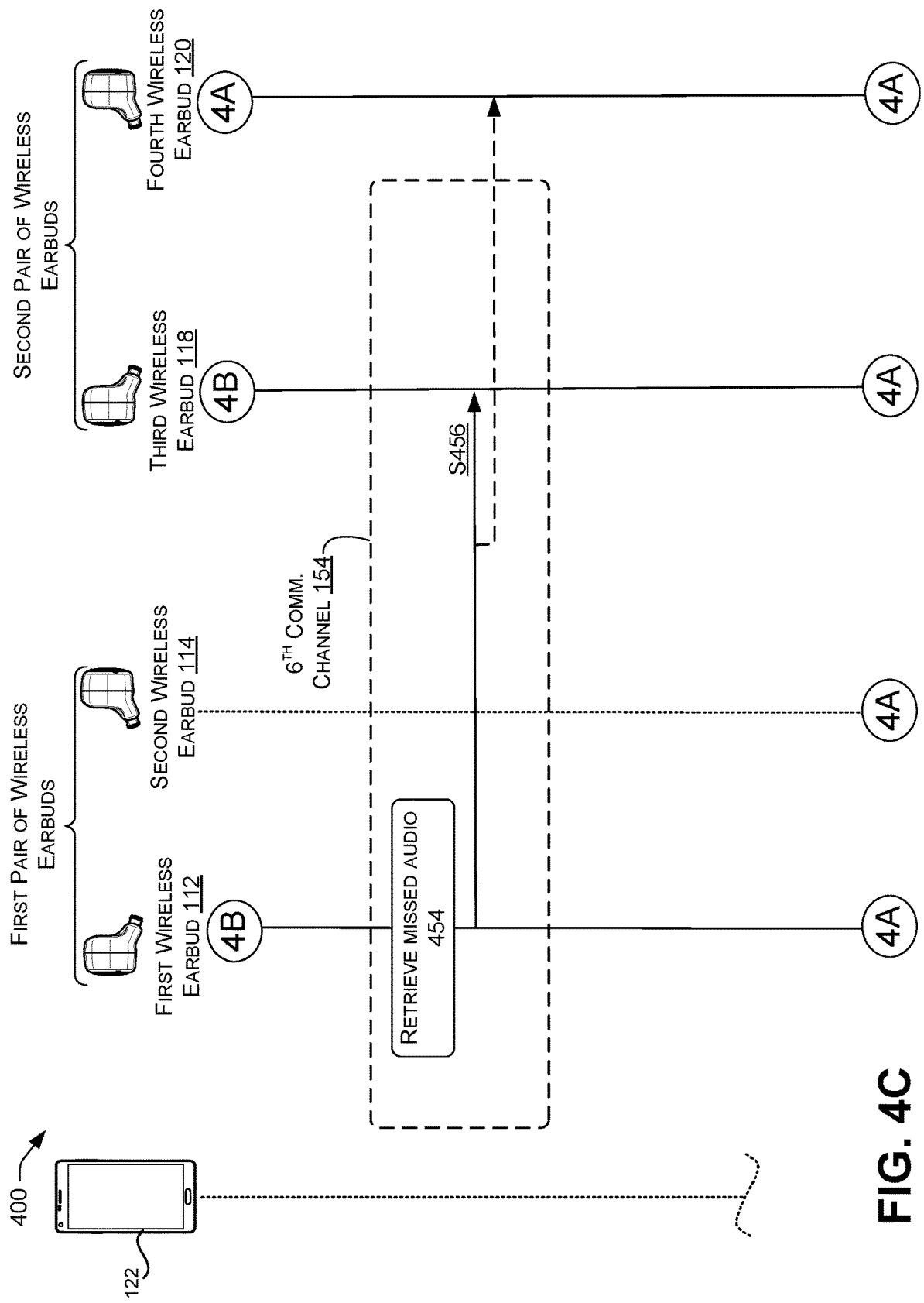

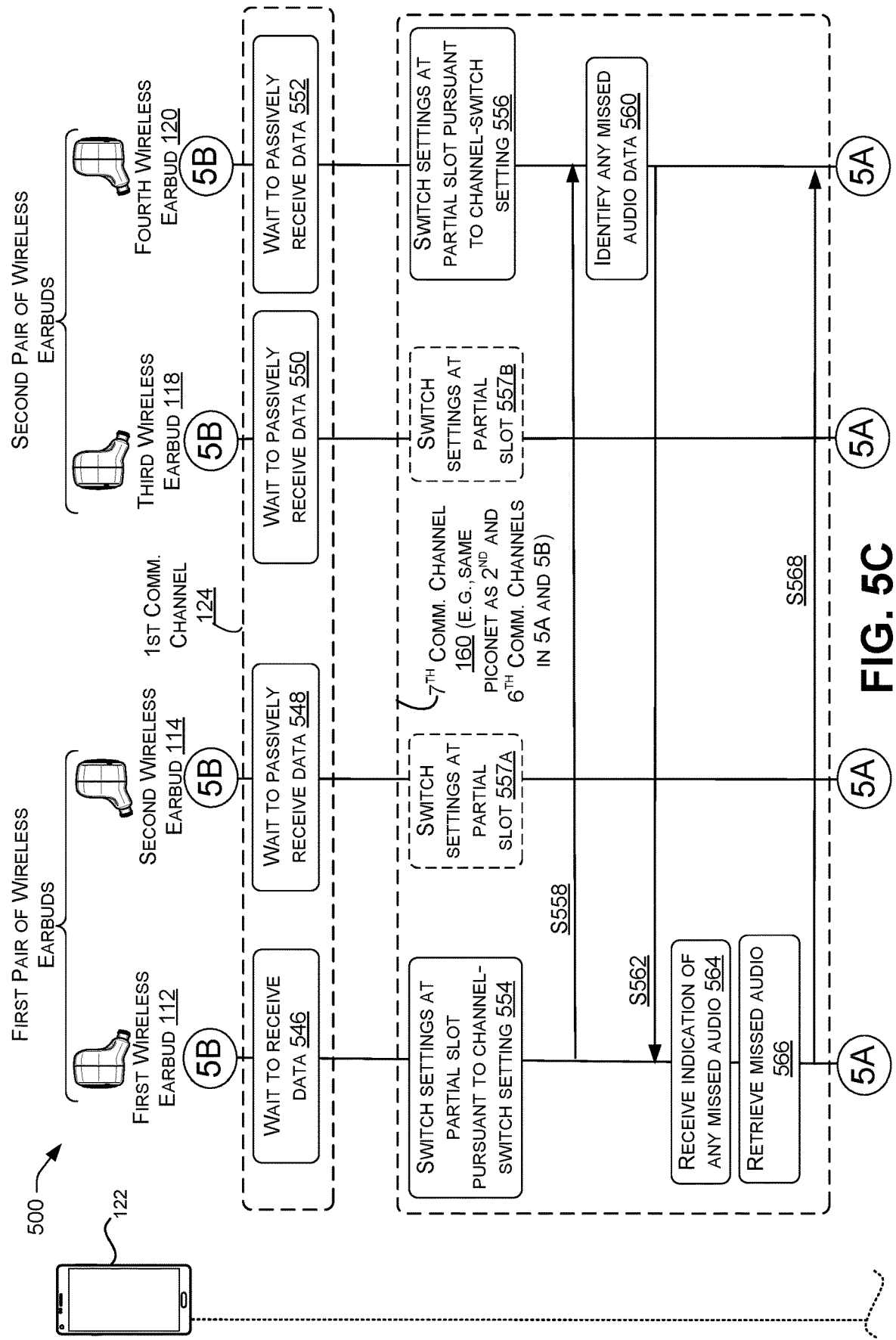

SHARING AUDIO FROM A SOURCE DEVICE

RELATED APPLICATIONS

This application is a continuation of and claims the benefit of U.S. patent application Ser. No. 17/217,201, filed on Mar. 30, 2021, which claims the benefit of U.S. Provisional Patent Application No. 63/120,563, filed on Dec. 2, 2020, both of which are hereby incorporated by reference in their entirety.

BACKGROUND

Digital audio (e.g., related to a song or video content) is often wirelessly streamed from a source device (e.g., mobile device or television) to a speaker (e.g., wireless earbud, wireless headphone, or smart speaker), such as over a Bluetooth connection. However, some wireless communication protocols (e.g., classic Bluetooth or Basic Rate/Enhanced Data Rate (BR/EDR)), may be limited in some respects. For example, a source device executing classic Bluetooth may not be able to broadcast digital audio to multiple devices at the same time, even though there are instances in which it would be useful, such as when two or more people want to listen to the same audio on separate pairs of wireless headphones (e.g., while watching a video on a shared device).

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 4A-4D collectively illustrate an example signal diagram of processes for a first wireless earbud to check in with a second wireless earbud and with a second pair of wireless earbuds using different communication channels. Once the first wireless earbud is notified of any missed packets, the first wireless earbud may forward the missed packets to the other earbuds.

FIG. 5A-5C collectively illustrate an example signal diagram of another process for a first wireless earbud to check in with a second wireless earbud and with a second pair of wireless earbuds using a same communication channel. Once the first wireless earbud is notified of any missed packets, the first wireless earbud may forward the missed packets to the other earbuds.

DETAILED DESCRIPTION

Figure 1:
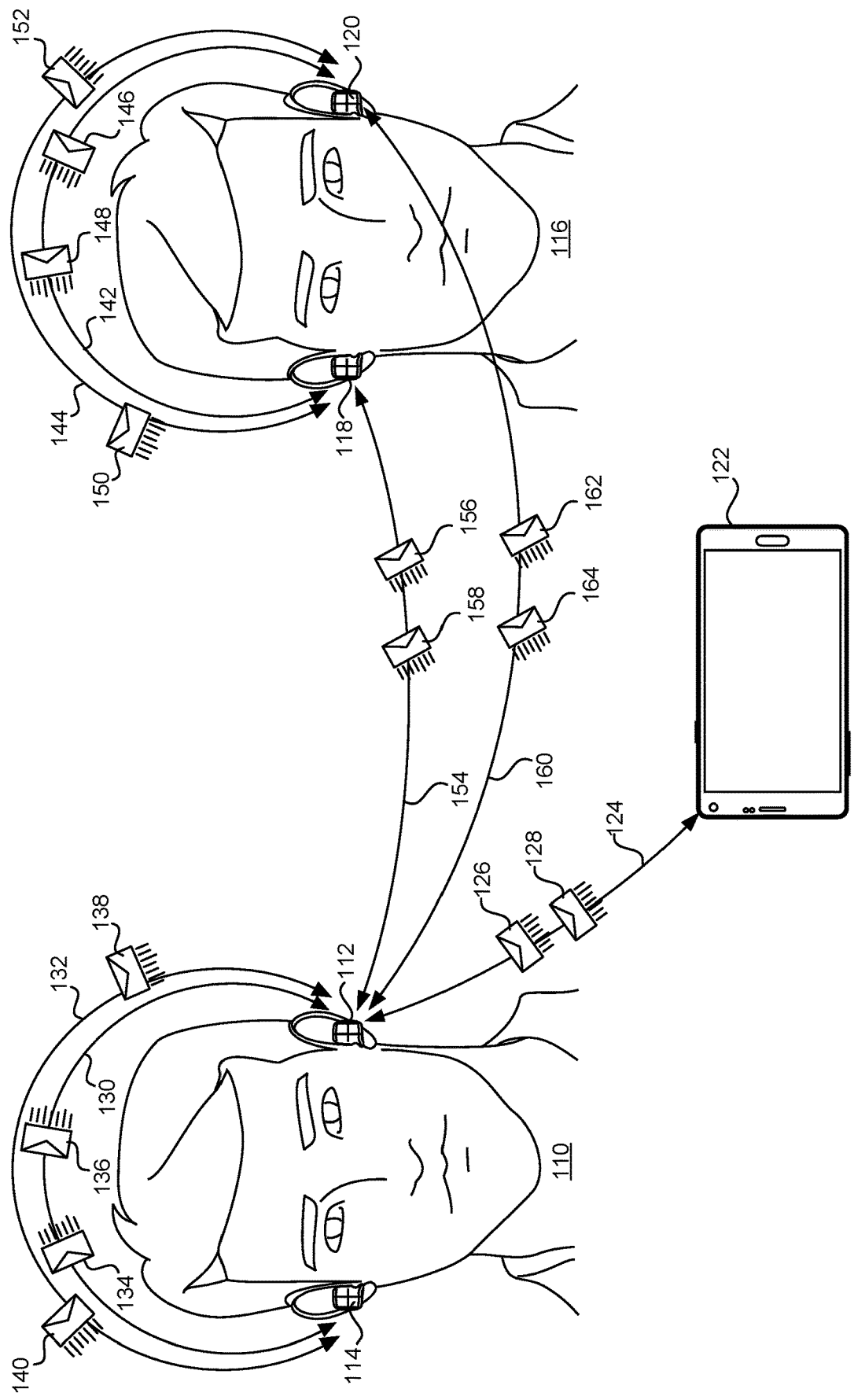
FIG. 1 illustrates a first user wearing a first pair of wireless earbuds and a second user wearing a second pair of wireless earbuds. In this example, one of the earbuds in the first pair is in communication with a source device, the other earbud in the first pair, and one of the wireless earbuds in the second pair, and may also be in communication with the other earbud in the second pair.

Subject matter of the present disclosure relates to sharing audio streamed from a source device, such as audio streamed from the source device over a wireless communication protocol. For example, a first wireless speaker (e.g., wireless earbud, wireless headphone, or smart speaker) may receive audio data from a source device and forward the audio data to one or more other wireless speakers pursuant to various timing or synchronization approaches. Audio sharing may occur in various contexts. For instance, two or more people may be viewing a display screen of a shared device (e.g., a television in a living room or a mobile device on an airplane) to watch a video. It may be desirable to not use the speaker of the shared device (e.g., to not disturb others in the vicinity), and each person viewing the shared display screen may be wearing wireless headphones (e.g., wireless earbuds, in-ear, over-ear, on-ear, etc.). In that case, the device (e.g., "source device) may stream audio data to a first wireless earbud (e.g., via a classic Bluetooth connection), and the first wireless earbud may forward the audio data to one or more other wireless earbuds (e.g., to the other wireless earbud paired with the first wireless earbud and to the other pair of wireless earbuds). In another example, two or more people may want to listen to audio (e.g., music, podcast, audio book) from a single source device, and each person may be wearing wireless earbuds (e.g., wireless earbuds, in-ear, over-ear, on-ear, etc.). In that case, the single source device may stream audio data to a first wireless earbud (e.g., via a classic Bluetooth connection), and the first wireless earbud may forward the audio data to one or more other wireless earbuds (e.g., to the other wireless earbud paired with the first wireless earbud and to the other pair of wireless earbuds). In a further example, several wireless speakers (e.g., two, three, or more speakers) may be arranged throughout an area (e.g., in different rooms of a house). A source device may stream audio data to one of the wireless speakers (e.g., via a classic Bluetooth connection), and the speaker may forward the audio data to one or more of the other speakers.

When exchanging data wirelessly (e.g., via Bluetooth) synchronization between devices may be helpful in various respects. For example, synchronization may help a recipient device organize the received streamed content and may help a device track when it's the device's turn to either receive or transmit information. In addition, synchronization may help a device track when to hop frequencies or when to switch from one channel to another channel. One aspect of this disclosure is directed to a first wireless speaker (e.g., a coordinator wireless speaker), which is wirelessly connected to a source device, sharing audio content with multiple other wireless speakers (e.g., responder wireless speaker) in a synchronized manner.

A coordinator wireless speaker may include a wireless earbud in a pair of wireless earbuds (e.g., earbuds, over-the-ear, on-the-ear, in-the-ear, etc.) or other types of wireless loudspeakers (e.g., cubes, soundbars, portable speakers, smart speakers, etc.). Likewise, a responder wireless speaker may include a wireless earbud (e.g., earbuds, over-the-ear, on-the-ear, in-the-ear, etc.) paired together with a coordinator wireless speaker to make a pair of wireless earbuds or another wireless speaker. The coordinator wireless speaker may synchronize with a responder wireless speaker in various manners. For example, a coordinator wireless speaker may forward source-device information (e.g., address, media channel identifier (CID), clock info, Adaptive Frequency Hopping (AFH) map, link key, etc.) to the responder wireless speaker, and the coordinator wireless speaker and the responder wireless speaker may adjust control parameters to sync to the source device. When synchronized, the coordinator wireless speaker may check in with the responder wireless speaker in various manners. For example, the coordinator wireless speaker and the responder wireless speaker may switch over to a different communication channel (e.g., different than the channel between the coordinator wireless speaker and the source device) at scheduled check-in times (e.g., partial slots, programmed intervals, etc.). In addition to increasing the likelihood the coordinator wireless speaker and the responder wireless speaker connect, switching at scheduled check-in times may efficiently utilize bandwidth by minimizing the time speakers might listen or wait on a channel before receiving a communication.

Forwarding source-device information from a coordinator wireless speaker to a responder wireless speaker may facilitate audio sharing in other ways. For example, once a responder wireless speaker receives the source-device information, the responder wireless speaker may passively receive data transmitted along the communication channel between the coordinator wireless speaker and the source device. By passively receiving, the responder wireless speaker may capture audio data streamed from the source device to the coordinator wireless speaker without transmitting communications (e.g., acknowledgement "ACK") back to the source device. As such, when the responder wireless speaker checks in with the coordinator wireless speaker (e.g., at the partial-slot or the programmed interval), the responder wireless speaker may provide an update identifying any missed audio data, which may be provided by the coordinator wireless speaker.

According to an aspect of the present disclosure, audio data may be shared among multiple sets of wireless earbuds. For example, a coordinator wireless earbud may be synchronized with a paired responder wireless earbud (e.g., in a first pair of wireless earbuds) and may also be synchronized with one or more responder wireless earbuds in a second pair of wireless earbuds. As such, the coordinator wireless earbud may actively receive audio data from a source device using a first communication channel, while the other responder wireless earbuds passively receive audio data on the first communication channel. According to one or more various timing mechanisms, the coordinator wireless earbud may check in with the paired responder wireless earbud in the first pair of wireless earbuds and with one or more of the responder wireless earbuds in the second pair of wireless earbuds to verify whether any audio data was missed by the responder wireless earbuds while passively receiving. The coordinator wireless earbud may then provide any missed audio data to the responder wireless earbuds.

With reference to FIG. 1, FIG. 1 illustrates a first user 110 wearing a first wireless earbud 112 (e.g., wireless earbud) and a second wireless earbud 114 (e.g., wireless earbud), which may be referred to in this disclosure as a first pair of wireless earbuds. In addition, FIG. 1 illustrates a second user 116 wearing a third wireless earbud 118 (e.g., wireless earbud) and a fourth wireless earbud 120 (e.g., wireless earbud), which may be referred to in this disclosure as a second pair of wireless earbuds. The first wireless earbud 112 is connected to a source device 122 via a first wireless communication channel 124, over which the first wireless earbud 112 receives link data 126 (e.g., source-device information) and audio data 128 (e.g., audio data), which the first wireless earbud may forward to other of the wireless earbuds. In this disclosure, the first wireless earbud 112 may also be referred to as a coordinator wireless earbud or a lead primary wireless earbud; the second wireless earbud 114 may be referred to a responder wireless earbud or a lead secondary wireless earbud; the third wireless earbud 118 may be referred to as a responder wireless earbud or a follower primary wireless earbud; and the fourth wireless earbud 120 may be referred to as a responder wireless earbud or a follower secondary wireless earbud.

In some instances, the first wireless earbud 112 and the second wireless earbud 114 may be physically similar and look alike. For example, in some instances, the first wireless earbud 112 and the second wireless earbud 114 may be physically indistinguishable by the user 110, while in other instances one of the earbuds may be designed for and designated as a right earbud while the other may be designed for and designated as a left earbud. In this example, the first wireless earbud 112 is shown residing within the left ear of the user 110 while the second wireless earbud 114 is shown residing within the right ear of the user 110. In some instances, the wireless earbuds 112 and 114 may resemble earbud earbuds that fit within the ear and/or ear canal of the user, while in other instances the earbuds may reside atop the ear, on the ear, or around the ear of the user 110.

In addition, the third wireless earbud 118 and the fourth wireless earbud 120 may be physically similar and look alike. In some instances, the third wireless earbud 118 and the fourth wireless earbud 120 may be physically indistinguishable by the user 116, while in other instances one of the earbuds may be designed for and designated as a right earbud while the other may be designed for and designated as a left earbud. In this example, the third wireless earbud 118 is shown residing within the right ear of the user 116 while the fourth wireless earbud 120 is shown residing within the left ear of the user 116. In some instances, the wireless earbuds 118 and 120 may resemble earbud earbuds that fit within the ear and/or ear canal of the user, while in other instances the earbuds may reside atop the ear, on the ear, or around the ear of the user 116. The first pair of earbuds 112 and 114 may resemble the second pair of earbuds 118 and 120. For example, the first pair of earbuds 112 and 114 may be a same model and version as the second pair of earbuds and 118 and 120. Alternatively, the first pair of earbuds 112 and 114 may be a different model or version or brand from the second pair of earbuds 118 and 120 and may be made by different manufacturers.

The first wireless earbud 112 may be communicatively coupled to the source device 122 using the first communication channel 124. In some instances, the first communication channel 124 may include Bluetooth (e.g., 802.11), ZigBee (e.g., 802.15.4), Z-wave, or the like. The first wireless earbud 112 may receive various information from the source device 122 over the first communication channel 124. For example, the first wireless earbud 112 may receive link data 126 (e.g., source-device information, such as address, media channel identifier (CID), clock info, Adaptive Frequency Hopping (AFH) map, link key, etc.) and audio data 128 from the source device 122 over the first communication channel 124. The audio data 128 may be related to a song, or other audio (e.g., corresponding to video content, podcast, audio book, etc.), to be output by the wireless earbuds 112 and 114. The first wireless earbud 112 may output the audio signal represented by the audio data 128 through a speaker of the first wireless earbud 112.

The first wireless earbud 112 may be communicatively coupled to the second wireless earbud 114 using a second communication channel 130 and a third communication channel 132. The second communication channel 130 and the third communication channel 132 may include Bluetooth Low Energy (BLE), ANT, Thread, Bluetooth, Wi-Fi, or the like. The first wireless earbud 112 may transmit link data 134 (e.g., a copy of link data 126) and audio data 136 (e.g., a copy of at least a portion of audio data 128) to the second wireless earbud 114 via the second communication channel 130. The second wireless earbud 114 may output audio signals representing the audio data 136 through a speaker of the second wireless earbud 114. In one example, after receiving the link data 134 and syncing (e.g., syncing Bluetooth settings), the second wireless earbud 114 may passively receive audio data 128 transmitted on the first communication channel 124. In addition, the first wireless earbud 112 may check in with the second wireless earbud 114 to determine whether any audio packets were missed, and if so, provide the missed audio packets (e.g., audio data 136 may be a copy of at least a portion of audio data 128).

The wireless earbuds 112 and 114 may be synched together (e.g., based on aligning settings using the link data 126 and the link data 134), such that the sound outputted at each wireless earbud sounds the same to the user 110. In addition, by synching together, the first wireless earbud 112 and the second wireless earbud 114 may increase the likelihood that both earbuds 112 and 114 will be available to communicate on the second communication channel 130 at the same time. In a further aspect, control data 138 and 140 (e.g., volume up, volume down, pause, play, stop, skip forward, skip back, etc.) may be exchanged between the first wireless earbud 112 and the second wireless earbud 114 over the third communication channel 132.

In some instances, as the first wireless earbud 112 and the second wireless earbud 114 may be indistinguishable, the user 110 may conduct an out-of-box experience (OOBE) with the wireless earbuds 112 and 114 to associate the source device 122 with the wireless earbuds 112 and 114. The OOBE may also configure one of the wireless earbuds 112 and 114 as the first wireless earbud 112 and another of the wireless earbuds 112 and 114 as the second wireless earbud 114. In some instances, the first wireless earbud 112 may be considered a primary wireless earbud or a coordinator wireless earbud as it receives the audio data 128 and the link data 126 from the source device 122, while the second wireless earbud 114 may be considered a secondary wireless earbud or responder wireless earbud. The designation and role as "coordinator" may change under various circumstances. For example, if a signal between the second wireless earbud 114 and the source device 122 is stronger than between the first wireless earbud 112 and the source device 122, then the second wireless earbud 114 may function as the coordinator wireless speaker. If the first wireless earbud has already been designated the coordinator and the second wireless earbud 114 is better suited in a circumstance (e.g., stronger signal), then a handoff protocol may be executed to temporarily halt a flow of data while the roles switch.

In addition, the third wireless earbud 118 may be communicatively coupled to the fourth wireless earbud 120 using a fourth communication channel 142 and a fifth communication channel 144. The fourth communication channel 142 and the fifth communication channel 144 may include Bluetooth Low Energy (BLE), ANT, Thread, Bluetooth, Wi-Fi, or the like. The third wireless earbud 118 may transmit link data 146 and audio data 148 to the fourth wireless earbud 120 via the fourth communication channel 142. The fourth wireless earbud 120 may output audio signals representing the audio data 148 through a speaker of the fourth wireless earbud 120. The wireless earbuds 118 and 120 may be synched together (e.g., based on aligning settings using the link data 146), such that the sound outputted at each wireless earbud sounds the same to the user 116. In addition, control data 150 and 152 (e.g., volume up, volume down, pause, play, stop, skip forward, skip back, etc.) may be exchanged between the third wireless earbud 118 and the fourth wireless earbud 120 over the seventh communication channel 156.

The third wireless earbud 118 and the fourth wireless earbud 120 may also be set up so that the third wireless earbud 118 is a primary earbud or a coordinator earbud in the second pair of wireless earbuds. For example, if the second pair of wireless earbuds were to connect to a source device (e.g., independently of the first pair of wireless earbuds 112 and 114), then the third wireless earbud 118 may be the primary earbud or the coordinator earbud for receiving data from the source device and forwarding the data to the fourth wireless earbud. In addition, in some examples, the third wireless earbud (as the primary in the second pair) may receive data from the first wireless earbud 112 and forward that data to the fourth wireless earbud 120.

As indicated above, FIG. 1 depicts the first pair of wireless earbuds 112 and 114, which may communicate over the communication channels 130 and 132, and the second pair of earbuds 118 and 120, which may communicate over the communication channels 142 and 144. In a further aspect, the first wireless earbud 112 may also be communicatively coupled to the third wireless earbud 118 using a sixth communication channel 154. The sixth communication channel 154 may include Bluetooth Low Energy (BLE), ANT, Thread, Bluetooth, Wi-Fi, or the like. The first wireless earbud 112 may transmit link data 156 (e.g., a copy of link data 126) and audio data 158 (e.g., a copy of at least a portion of audio data 128) to the third wireless earbud 118 via the sixth communication channel 154. In one example, after receiving the link data 156 and syncing (e.g., syncing Bluetooth settings), the third wireless earbud 118 may passively receive audio data 128 transmitted on the first communication channel 124. In addition, the first wireless earbud 112 may check in with the third wireless earbud 118 to determine whether any audio packets were missed, and if so, provide the missed audio packets (e.g., audio data 158 may be a copy of at least a portion of audio data 128). The third wireless earbud 118 may output audio signals representing the audio data 158 through a speaker of the third wireless earbud 118, and the wireless earbuds 112 and 118 may be synched together (e.g., based on aligning settings using the link data 126 and 156), such that the sound outputted at each wireless earbud is similarly presented.

Sharing with the fourth wireless earbud 120 may be carried out in various manners. For example, in one aspect, the third wireless earbud 118, which is a coordinator wireless earbud in the second pair of wireless earbuds 118 and 120, may forward link data to the fourth wireless earbud 120, which the fourth wireless earbud 120 may use to sync to the source device 122. As such, the fourth wireless earbud 120 may also passively receive audio data 128 transmitted on the communication channel 124. In addition, the third wireless earbud 118 may check in with the fourth wireless earbud 120 to determine whether any audio packets were missed, and if so, provide the missed audio packets.

In an alternative aspect, the first wireless earbud 112 may also be communicatively coupled to the fourth wireless earbud 120 using a seventh communication channel 160, which may include Bluetooth Low Energy (BLE), ANT, Thread, Bluetooth, Wi-Fi, or the like. The first wireless earbud 112 may transmit link data 162 (e.g., a copy of link data 126) and audio data 164 (e.g., a copy of at least a portion of audio data 128) to the fourth wireless earbud 120 via the seventh communication channel 160. In one example, after receiving the link data 124 and syncing (e.g., syncing Bluetooth settings), the fourth wireless earbud 120 may passively receive audio data 128 transmitted on the first communication channel 124. In addition, the first wireless earbud 112 may check in with the fourth wireless earbud 120 to determine whether any audio packets were missed, and if so, provide the missed audio packets (e.g., audio data 164 may be a copy of at least a portion of audio data 128). The fourth wireless earbud 120 may output audio signals representing the audio data 164 through a speaker of the fourth wireless earbud 120, and the wireless earbuds 112 and 120 may be synced together, such that the sound outputted at each wireless earbud is similarly presented.

In some aspects of the present disclosure, each of the communication channels 124, 130, 132, 142, 144, 154 and 160 may be a separate communication channel or piconet. For instance, the second communication channel 130, the sixth communication channel 154, and the seventh communication channel 160 may all be separate communication channels. In other aspects, one or more of the communication channels may be a same communication channel or piconet that is used to exchange data between different pairs of wireless speakers at different times. For example, the second communication channel 130, the sixth communication channel 154, and the seventh communication channel 160, or any combination thereof may all be a same communication channels that used at different times to exchange data between the first wireless earbud 112 and the other wireless earbuds 114, 118, and 120. Further still, one or more of the communication channels may be omitted. For example, the seventh communication channel 160 may be omitted, in which case the third wireless earbud 118 may relay data between the first wireless earbud via the sixth communication channel 154 and the fourth communication channel 142.

Figure 2:
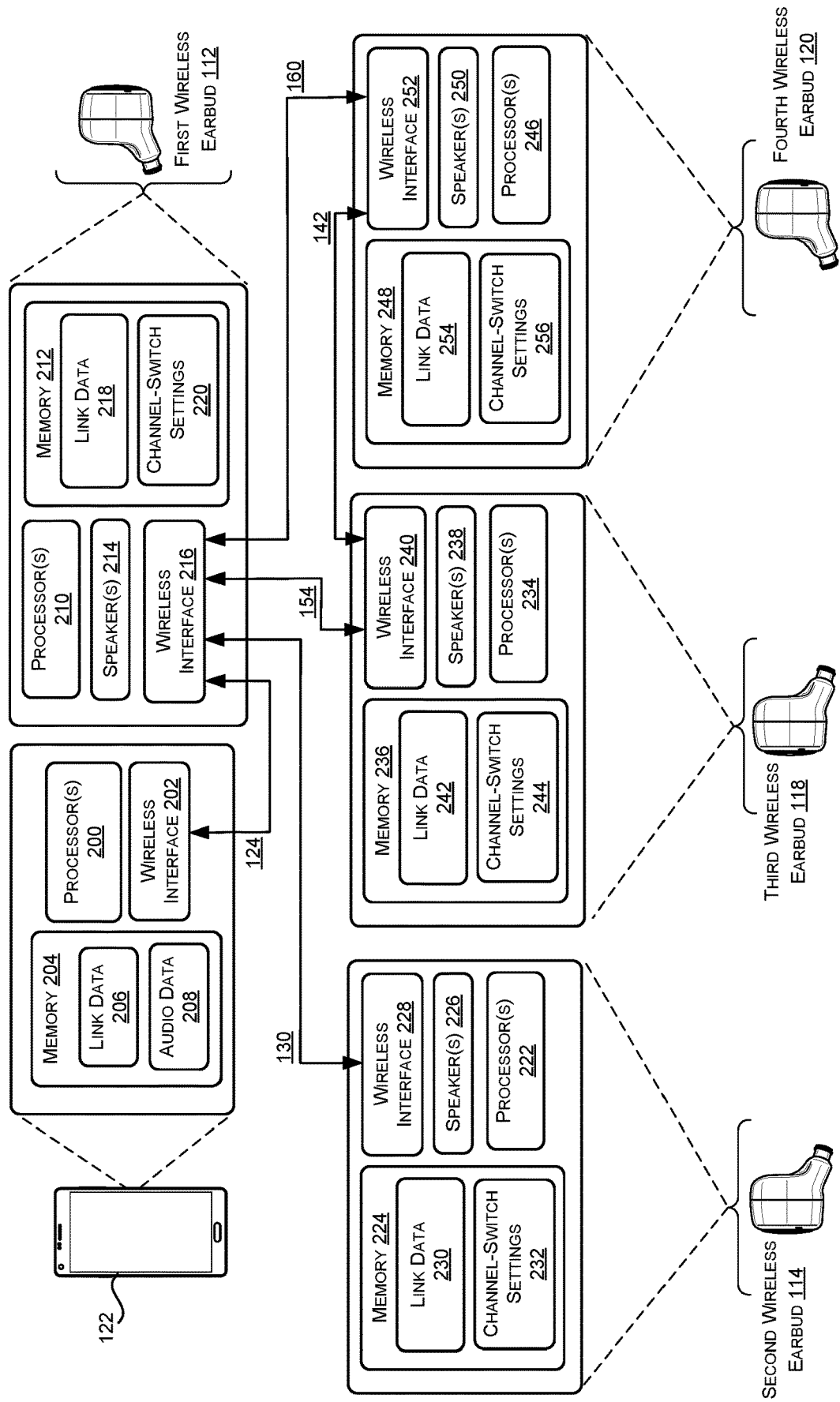
FIG. 2 illustrates a functional block diagram of example wireless earbuds, as well as communication channels between the wireless earbuds and between one of the wireless earbuds and a source device.

Referring to FIG. 2, FIG. 2 illustrates selected functional components of the source device 122, the first wireless earbud 112, the second wireless earbud 114, the third wireless earbud 118, and the fourth wireless earbud 120. In addition, FIG. 2 illustrates that the source device 122 may exchange data with the first wireless earbud 112 over the first communication channel 124; the first wireless earbud 112 may exchange data with the second wireless earbud 114 over the second communication channel 130; the first wireless earbud 112 may exchange data with the third wireless earbud 118 over the sixth communication channel 154; the first wireless earbud 112 may exchange data with the fourth wireless earbud 120 over the seventh communication channel 160; and the third wireless earbud 118 may exchange data with the fourth wireless earbud 120 over the fourth communication channel 142.

As illustrated, the source device 122 includes processor(s) 200, a wireless network interface 202 (e.g., classic Bluetooth interface or Bluetooth Basic Rate/Enhanced Data Rate (BR/EDR)), and memory 204 storing link data 206 (e.g., link data 126 or a copy thereof) and audio data 208 (e.g., audio data 128 of a copy thereof). The wireless interface 202 may be used to transmit link data 206 and audio data 208 to a wireless earbud. Absent subject matter described in this disclosure, the wireless interface 202 may be limited to transmitting the audio data 208 to a single wireless speaker at a time, and aspects of this disclosure share the audio data 208 received from the source device 122 across multiple wireless speakers. For example, not only may audio data be shared between the first wireless earbud 112 and the second wireless earbud 114, but the audio data may also be shared with the third wireless earbud 118 and the fourth wireless earbud 120.

The first wireless earbud 112 may include, among other things, processor(s) 210, memory 212, speaker(s) 214, and a wireless interface 216 (e.g., Bluetooth interface). As illustrated, the first wireless earbud 112 includes the memory 212, which stores or otherwise has access to various data, such as link data 218 and channel-switch settings 220. In some instances, the link data 218 may include information usable by the wireless interface 216 to communicate via one or more of the communication channels 124, 130, 154, and 160. For example, the link data 218 may include source-device information or link data 126 or 206 communicated from the source device 122 (e.g., source-device information, such as address, media channel identifier (CID), clock info, Adaptive Frequency Hopping (AFH) map, link key, etc.). The link data 218 may also include link information related to the settings for the other communication channels used by the first wireless speaker, such as settings for the second communication channel 130, the sixth communication channel 154, and the seventh communication channel 160. The first wireless earbud 112 may include other interfaces as well (not shown), such as a Bluetooth Low Energy (BLE) interface, a NFMI interface, a Wi-Fi interface, and the like.

The channel-switch settings 220 may include timing sequences, schemes, or intervals that are used by the first wireless earbud 112 to switch from one communication channel to a different communication channel. For example, the first wireless earbud 112 may use the channel-switch settings 220 to determine when to switch from a first communication channel 124 with the source device 122 to a different communication channel 130, 154, or 160 with one of the wireless earbuds 114, 118, or 120. One example of a channel-switch setting 220 is a periodic programmed interval every n slots, where n may be configured (e.g., every 36 slots). As used in this disclosure, a "slot" includes a discrete time duration (e.g., 625 microseconds), and a "programmed interval" includes a set of one or more discrete time durations having a quantity of discrete time durations. The quantity may be specified, programmed, controlled, etc. using the channel-switch settings. Under this type of example channel-switch setting 220, the first wireless earbud 112 may switch from the first communication channel 124 to another one of the communication channels 130, 142, or 144, at the beginning of each interval or when a previous interval lapses. A periodic programmed interval may be timed independently of source-device transmissions, such that each interval of n slots is counted or starts regardless of what transmissions are currently being sent by the source device. In other instances, the periodic programmed interval may be based on when a source device begins transmitting data (e.g., n slots after the source device starts transmitting audio data). Another example channel-switch setting 220 includes a partial-slot channel switch, in which case the first wireless earbud may listen on the first communication channel 124 at the beginning of a slot, and once no packets are received from the source device 122, may switch to a different communication channel in the middle of the slot (e.g., half-slot).

In one aspect, the first wireless earbud 112 may forward the link data 218 (e.g., a copy of the link data 206) and the channel-switch settings 220 to one or more of the other wireless earbuds 114, 118, and 120 to facilitate syncing. For example, the first wireless earbud 112 and the second wireless earbud 114 may establish a variety of different connections as typically available between a pair of wireless earbuds based on an OOBE, upon removal from a charging case, upon powering up, etc. As such, upon receiving link data 218 and/or channel-switch settings 220, the first wireless earbud 112 may forward them to the second wireless earbud 114.

In addition, the first wireless earbud 112 and the third wireless earbud 118 may establish a wireless connection 154 (e.g., Bluetooth classic connection) resulting from various triggers, such as the first wireless earbud 112 and the third wireless earbud 118 being located within a threshold distance from one another (e.g., based on Receiver Signal Strength Indicator (RSSI)) or some control action executed on both wireless earbuds 112 and 118). The wireless connection 154 may include a Bluetooth connection using a fixed Logical Link Control and Adaptation Protocol (L2CAP) based host connection and encrypt the link using an encryption key generated out of "Just works" pairing. The first wireless earbud 112 may forward link data 218 upon encryption of the channel 154.

The first wireless earbud 112 may forward link data 218 and channel-switch settings 220 to the fourth wireless earbud 120 upon encryption of the channel 160 (e.g., similar to the example described above with the third wireless earbud 118). In another aspect, the third wireless earbud 118 may forward the link data 218 and channel-switch settings 220 to the fourth wireless earbud 120 over the fourth communication channel 142 after the third wireless earbud 118 receives them from the first wireless earbud 112.

The second wireless earbud 114 may include components that are similar to the first wireless earbud 112, such as processor(s) 222, memory 224, speaker(s) 226, and a wireless interface 228. In addition, the second wireless earbud 114 may store in memory 224 link data 230 and channel-switch settings 232 received from the first wireless earbud 112. The link data 230 may be used by the second wireless earbud 114 to passively receive (e.g., "sniff" or "listen to") data on the first communication channel 124, the sixth communication channel 154, and the seventh communication channel 160. In addition, the link data 230 may be used to sync the first wireless earbud 112 and the second wireless earbud 114 so that audio data transmitted from the source device 122 is presented in a consistent manner across the devices using the speakers 214 and 226. Furthermore, the channel-switch settings 232 (e.g., programmed interval setting or partial-slot mechanism) may be used by the second wireless earbud 114 to switch from listing on the first communication channel 124 to receiving data from the first wireless earbud 112 on the second communication channel 130.

The third wireless earbud 118 may also include components that are similar to the first wireless earbud 112, such as processor(s) 234, memory 236, speaker(s) 238, and a wireless interface 240. In addition, the third wireless earbud 118 may store in memory 236 link data 242 and channel-switch settings 244 received from the first wireless earbud 112. The link data 230 may be used by the third wireless earbud 118 to passively receive (e.g., "sniff" or "listen to") data on the first communication channel 124, the second communication channel 130, and the seventh communication channel 160. In addition, the link data 230 may be used to sync the first wireless earbud 112 and the third wireless earbud 118 so that audio data transmitted from the source device 122 is presented in a consistent manner across the devices using the speakers 214 and 238. Furthermore, the channel-switch settings 244 may be used by the third wireless earbud 118 to switch from listing on the first communication channel 124 to receiving data from the first wireless earbud 112 on the sixth communication channel 154.

The fourth wireless earbud 120 may also include components that are similar to the first wireless earbud 112, such as processor(s) 246, memory 248, speaker(s) 250, and a wireless interface 252. In addition, the fourth wireless earbud 120 may store in memory 248 link data 254 and channel-switch settings 256 received from the first wireless earbud 112 or from the third wireless earbud 118. The link data 254 may be used by the fourth wireless earbud 120 to passively receive data via the first communication channel 124, the second communication channel 130, and the sixth communication channel 154. In addition, the link data 254 may be used to sync the fourth wireless earbud 120 with the first wireless earbud 112 and/or the third wireless earbud 118 so that audio data transmitted from the source device 122 is presented in a consistent manner across the devices using the speakers 214, 238, and 250. Furthermore, the channel-switch settings 256 may be used by the fourth wireless earbud 120 to switch from listing on the first communication channel 124 to receiving data from the first wireless earbud 112 on the seventh communication channel 160 or receiving data from the third wireless earbud 118 on the fourth communication channel 142.

As used herein, a processor, such as processor(s) 200, 210, 222, 234, and 246 may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

The memory 204, 212, 22, 236, and 248 may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

FIGS. 3, 4A, 4B, 5A, 5B, 5C, and 6-8 illustrate various processes related to sharing audio provided by a source device 122 (e.g., by a wireless communication channel, such as Bluetooth). The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform functions or implement particular data types. The order in which the blocks are described should not be construed as a limitation, unless specifically noted. Any number of the described blocks may be combined in any order and/or in parallel to implement the process, or alternative processes, and not all the blocks need be executed. For discussion purposes, the processes are described with reference to the environments, architectures and systems described in the examples herein, such as, for example those described with respect to FIGS. 1 and 2, although the processes may be implemented in a wide variety of other environments, architectures and systems. Furthermore, although FIGS. 3, 4A, 4B, 5A, 5B, and 5C illustrate wireless earbuds in accordance with one aspect of this disclosure, in other aspects, the example processes 300, 400, and 500 may be performed by other types of wireless speakers (e.g., smart speakers).

Figure 3:
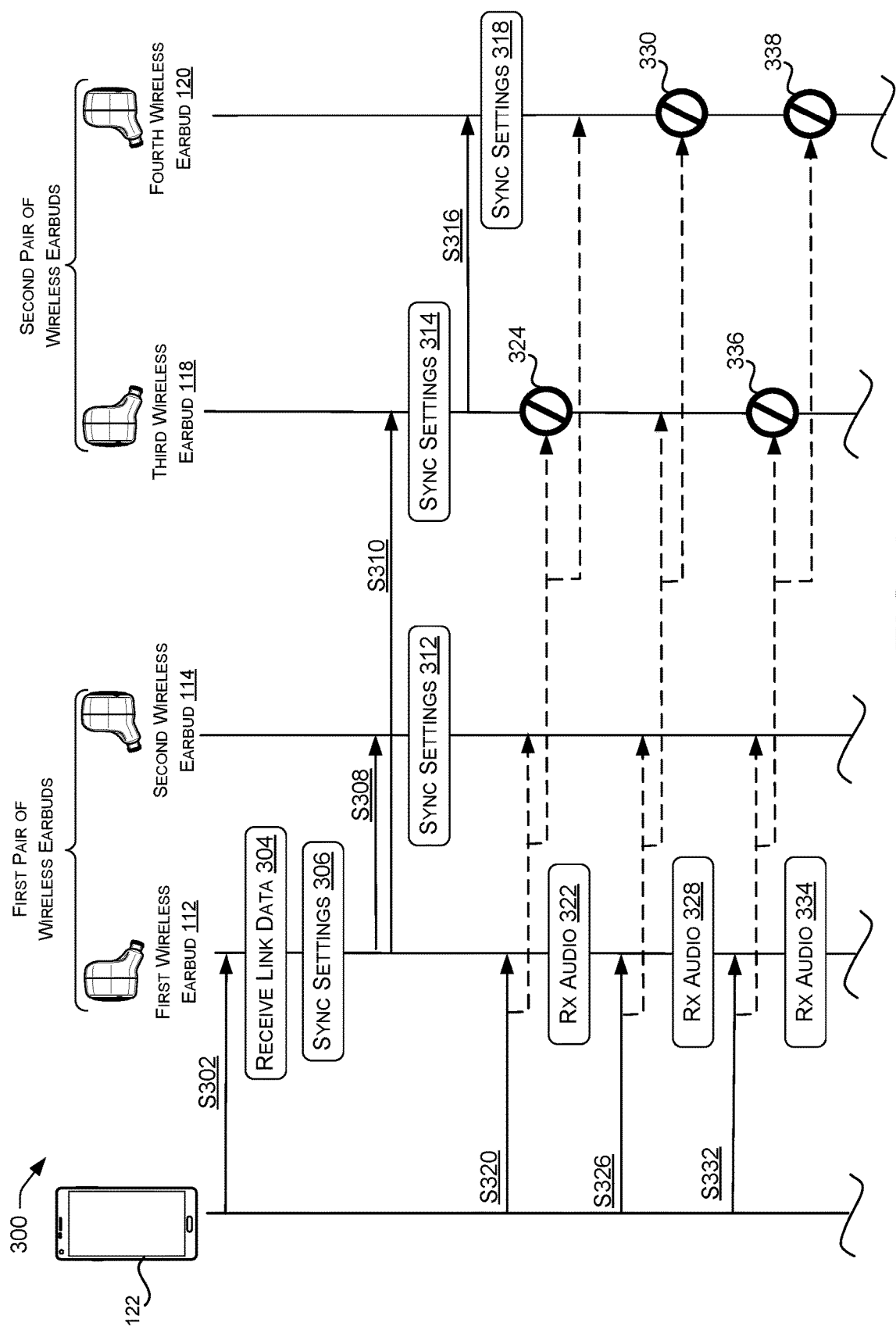
FIG. 3 illustrates a first example signal diagram for sharing audio data from a first pair of wireless earbuds to a second pair of wireless earbuds. In some instances, one or both earbuds in the second pair may fail to receive some packets of audio when sniffing on a transmission from a source device. In that case, one of the earbuds from the first pair may provide the missed packets following a process outlined in FIGS. 4A and 4B or a process outlined in 5A and 5B.

Referring to FIG. 3, FIG. 3 illustrates a signal diagram of an example process 300 for sharing audio provided a source device 122. FIG. 3 also depicts the first pair of wireless earbuds, which includes the first wireless earbud 112 and the second wireless earbud 114, and the second pair of wireless earbuds, which includes the third wireless earbud 118 and the fourth wireless earbud 120.

According to the process, a signal S302 (e.g., the link data 126) is transmitted from the source device 122 to the first wireless earbud 112 (e.g., via the first communication channel 124), and the first wireless earbud 112 receives the link data at 304 and syncs settings at 306 (e.g., using link data 218 to configure channel-switch settings 220). The first wireless earbud 112 transmits a signal S308 to the second wireless earbud 114 and a signal S310 to the third wireless earbud 118. Each of the second wireless earbud 114 and the third wireless earbud 118 may sync settings with the first wireless earbud 112 and the source device 122 at 312 and 314, respectively. Among other things, syncing may enable the first wireless earbud 112 to communicate with the second wireless earbud 114 on the second and third communication channels 130 and 132 and may enable the first wireless earbud 112 to communicate with the third wireless earbud 118 via the sixth communication channel 154. In addition, the third wireless earbud 118 may transmit a signal S316 to the fourth wireless earbud 120 (e.g., via the fourth communication channel 142), and the fourth wireless device 120 may also sync settings with the first wireless earbud 112, the third wireless earbud 118, and the source device 122 at 318. Although FIG. 3 depicts the third wireless earbud 118 transmitting the settings to the fourth wireless earbud 120, in another aspect, the first wireless earbud 112 may transmit the settings to the fourth wireless earbud 120. Syncing may enable the fourth wireless earbud 120 to communicate with the first wireless earbud 112 via the seventh communication channel 160 and with the third wireless earbud 118 via the fourth and fifth communication channels 142 and 144.

The process 300 further includes transmitting a signal S320 including audio data from the source device 122 to the first wireless earbud 112, and the first wireless earbud 112 receives audio data at 322 (and may transmit an acknowledgment back to the source device 122 acknowledging receipt). In an aspect of the disclosure, the second wireless earbud 114, the third wireless earbud 118, and the fourth wireless earbud 120 may attempt to passively receive the signal S320, including the audio data. This passive receiving or passive channel is illustrated using a dashed line, as opposed to the solid line depicting the channel between the first wireless earbud 112 and the source device 122.

In some instances, the second wireless earbud 114, the third wireless earbud 118, and the fourth wireless earbud 120 may each receive the audio data transmissions from the source device to the first wireless earbud 112. In other instances, the second wireless earbud 114, the third wireless earbud 118, and/or the fourth wireless earbud 120 may fail to receive at least some of the audio data in the source device 122 transmission. For example, in the process 300 the second wireless earbud 114 and the fourth wireless earbud 120 passively receive the audio data in the signal S320, whereas the third wireless earbud 118 misses, at 324, at least some of the audio data in the signal S320. In a further step, signal S326 is transmitted by the source device 122 and received, at 328, by the first wireless earbud 112. The second wireless earbud 114 and the third wireless earbud 118 passively receive the audio data in the signal S326, whereas the fourth wireless earbud 120 misses, at 330, at least some of the audio data in the signal S326. In yet another step, signal S332 is transmitted by the source device 122 and received, at 334, by the first wireless earbud 112 and passively received by the second wireless earbud 114. However, the third wireless earbud 118 misses, at 336, at least some of the audio data in the signal S332, and the fourth wireless earbud 120 misses, at 338, at least some of the audio data in the signal S332.

Figure 4A:
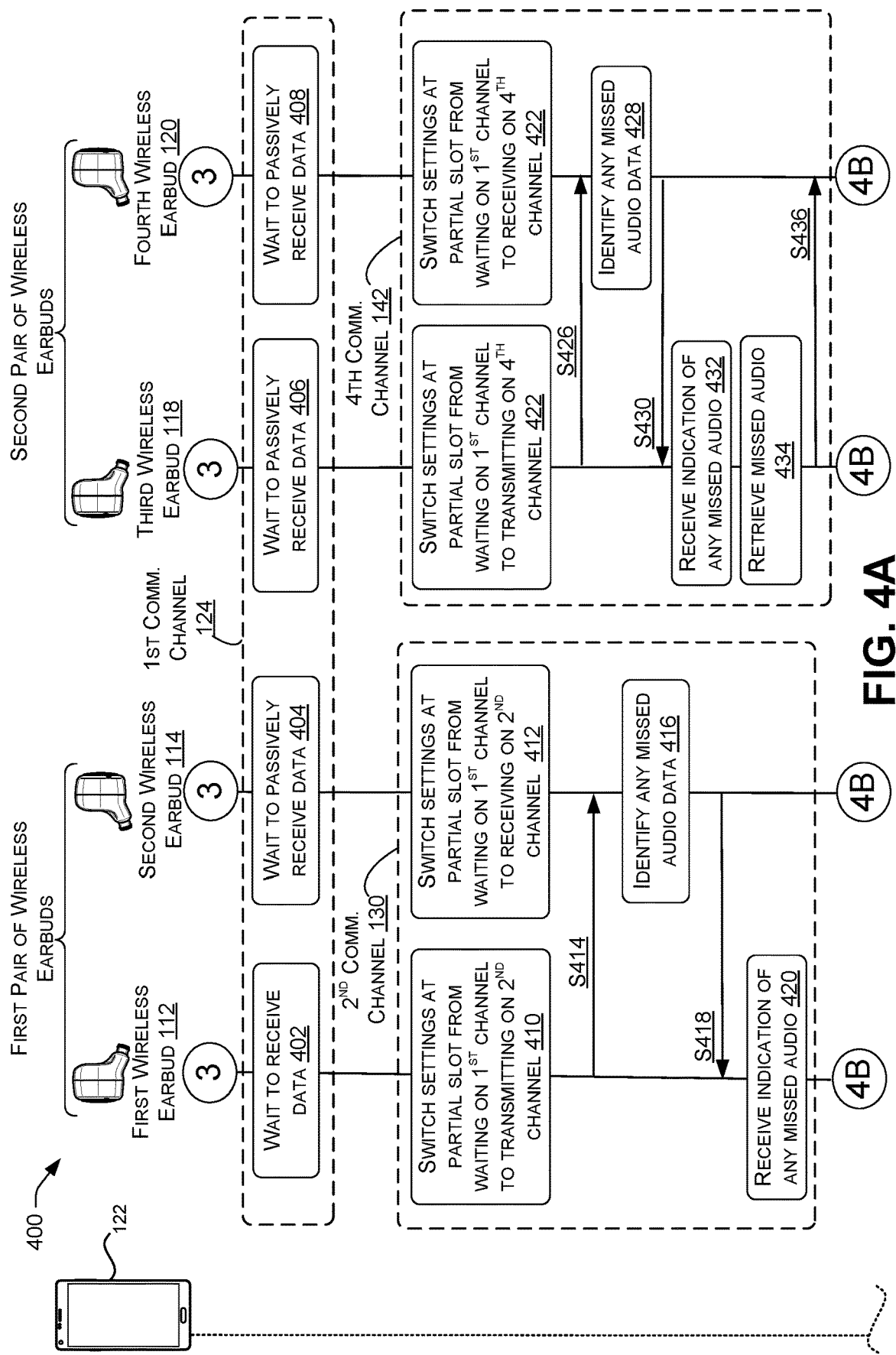
Figure 4B:
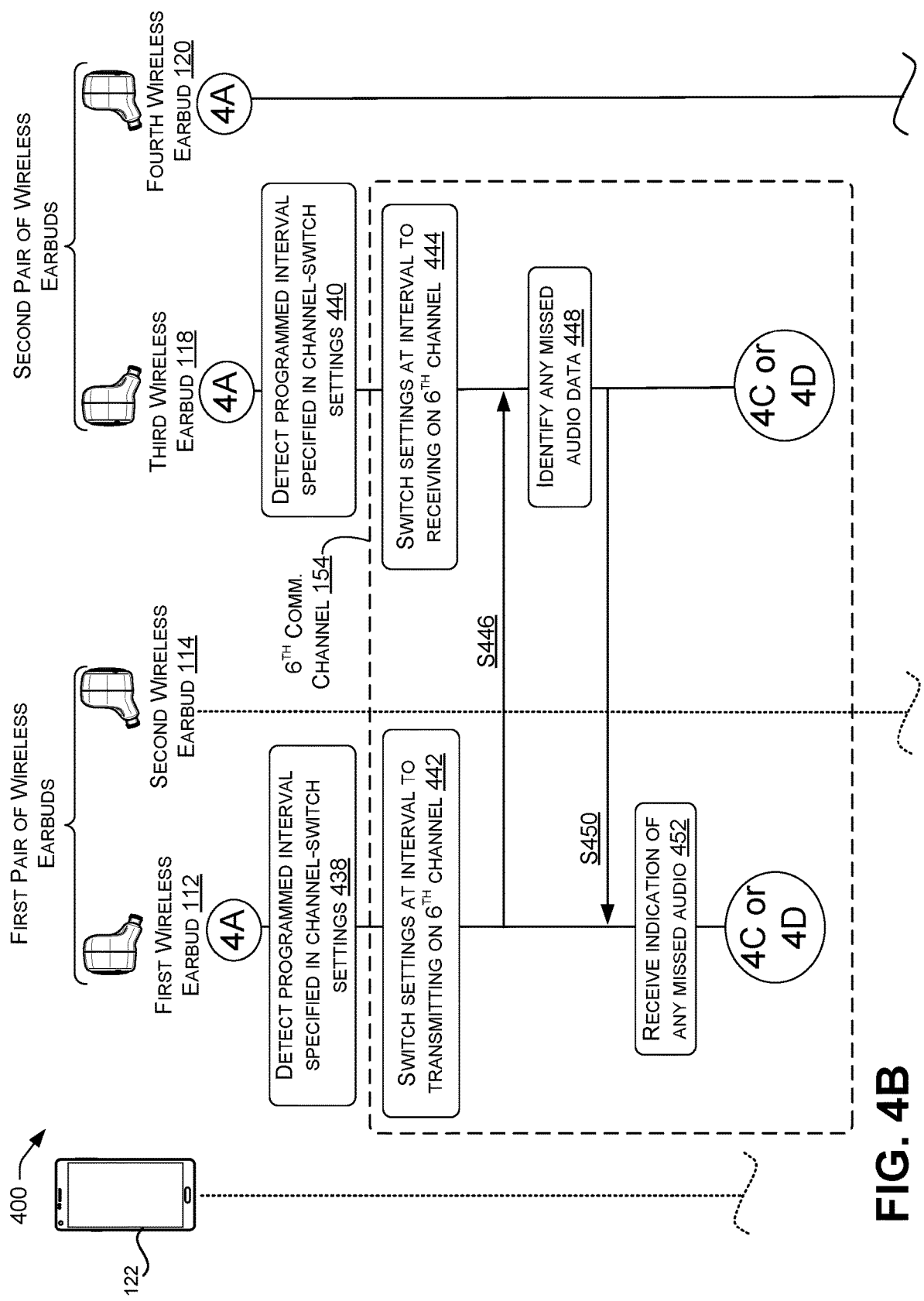
Figure 5A:
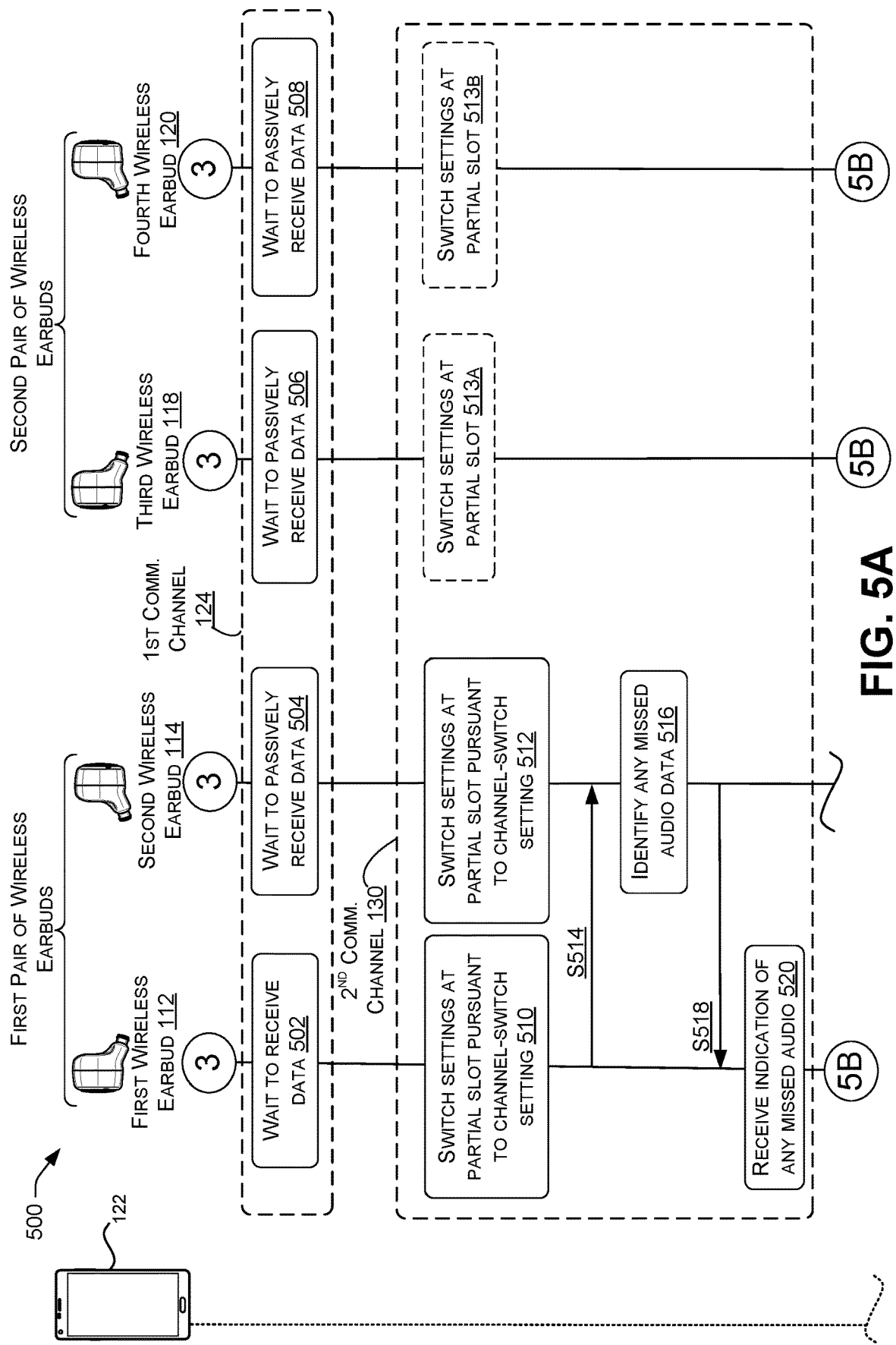
Figure 5B:
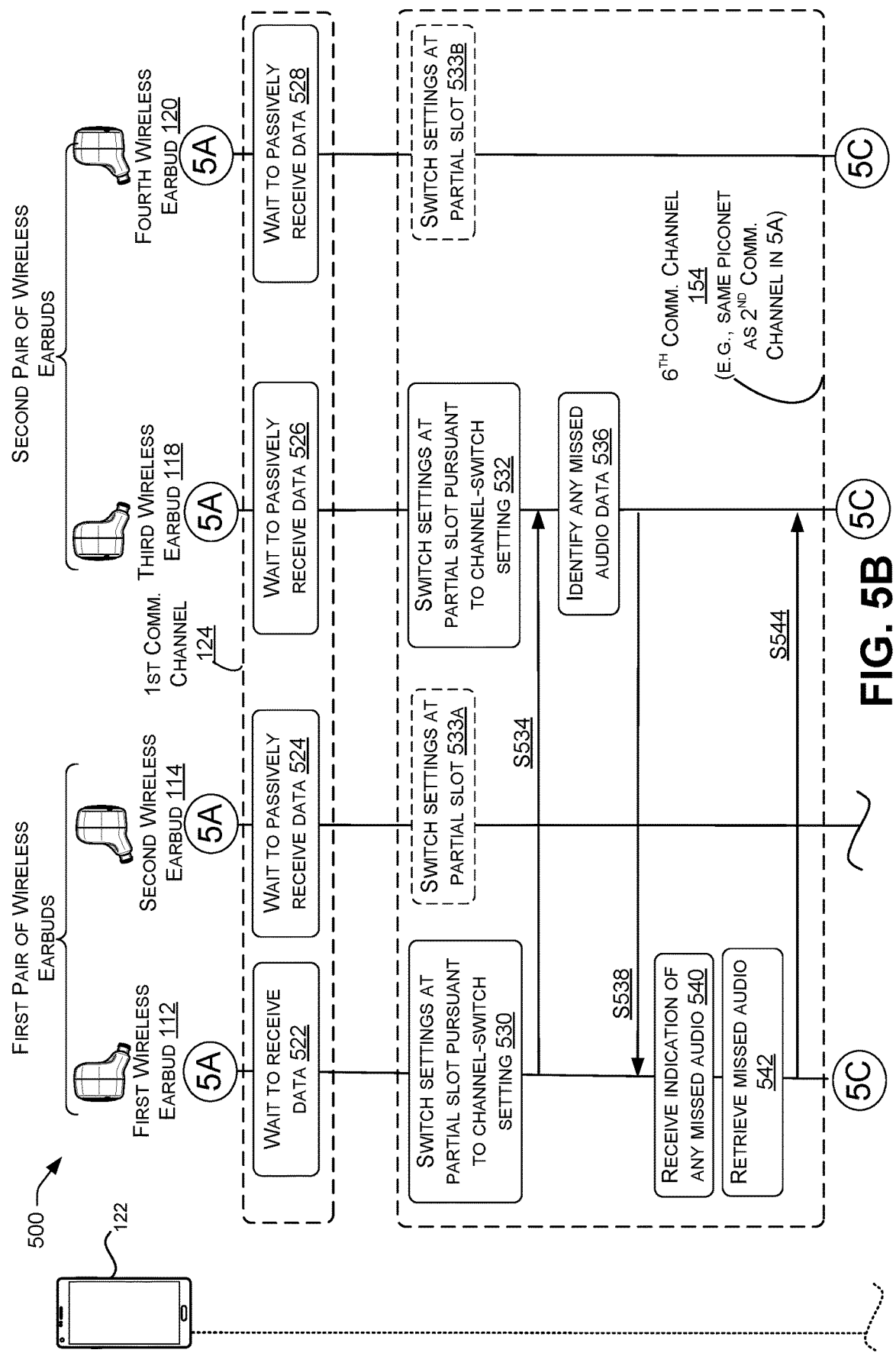

In the process 300, the first wireless earbud 112 receives the audio data at 322, 328, and 334. In an aspect of the present disclosure, the first wireless earbud 112 (e.g., the coordinator) may check in with the other wireless earbuds to provide any missed packets, and various check-in options are possible depending on the channel-switch settings (e.g., 220, 232, 244, and 256). In some instances, the check-in may be less dependent on whether, or asynchronous with, audio data being received from the source device 122 and may occur at programmed intervals (e.g., T_poll every n slots) An example of a process that implements programmed intervals is illustrated in FIGS. 4A, 4B, and 4C explained below. In other instances, the check-in may be based at least partially on whether audio data is being received from the source device 122 and may occur using partial-slot slot timing (e.g., half-slots). An example of a process that implements partial-slot timing is illustrated in FIGS. 5A, 5B, and 5C explained below. In addition, these approaches may be combined, and in some instances, a check-in may occur using partial-slot timing, while in other cases programmed intervals are used.

Referring to FIG. 4A, FIG. 4A illustrates a signal diagram of an example process 400 for sharing audio provided by a source device 122 (e.g., a source device providing audio via Bluetooth). In particular, the process 400 includes elements related to the first wireless earbud 112 checking in with the second wireless earbud 114, and the first wireless earbud 112 also checking in with the second pair of wireless earbuds 118 and 120, such as after the process 300 is executed or as a continuation of the process 300. In addition, the process includes a combination of timing and synchronization mechanisms to efficiently use the bandwidth.

The process 400 includes, at 402, the first wireless earbud 112 waiting to receive data by way of the first communication channel 124 (e.g., via which the source device 122 transmits audio data). For example, the first wireless earbud 112 may adjust settings (or leave settings if already set) to tune to a scheduled channel or frequency consistent with link data received from the source device 122 and prepare to receive any data (e.g., audio data) transmitted from the source device 122 on the first communication channel 124. In parallel, at 404, 406, and 408, the second wireless earbud 114, the third wireless earbud 118, and the fourth wireless earbud 120 are all set to passively receive (e.g., by listening or sniffing) data transmitted from the source device 122 on the first communication channel 124. In one example, the first wireless earbud 112, the second wireless earbud 114, the third wireless earbud 118, and the fourth wireless earbud 120 wait to receive data at the beginning of a slot (e.g., the next Rx slot after the signal S320 is received).

At 410, the first wireless earbud 112 pauses the waiting to receive on the first communication channel 124 pursuant to a channel-switch setting (e.g., channel-switch setting 220) and switches to transmit to the second wireless earbud 114 on another communication channel (e.g., second communication channel 130). In one example, the first wireless earbud 112 pauses the waiting on the first communication channel 124 and switches channels part way through a duration of the slot at which the waiting began (e.g., partial-slot transition or half-slot transition). For example, if a slot is 625 microseconds, then the first wireless earbud 112 may wait to receive data on the first communication channel 124 for about 100 microseconds before switching channels (e.g., to the second communication channel 130) about 312.5 microseconds into the slot. The channel-switch setting may include various types of instructions. For example, in one aspect, the channel-switch setting may instruct the first wireless earbud 112 to change channel settings from receiving on the first communication channel 124 to transmitting on the second communication channel 130 during the first slot after audio data has been received from the source device 122.

In sync with the first wireless earbud 112, at 412, the second wireless earbud 114 pauses the waiting to passively receive data on the first communication channel 124 pursuant to a channel-switch setting (e.g., channel-switch setting 232) and switches to receive from the first wireless earbud 112 on the second communication channel 130. Similar to the first wireless earbud 112, the second wireless earbud 114 may pause the waiting to passively receive and switch channels part way through a duration of the slot at which the waiting began (e.g., partial-slot transition or half-slot transition). The first wireless earbud 112 and the second wireless earbud 114 may be synchronized based on the settings being synced at 306 and 312.

Using the switched-to channel (e.g., the second communication channel 130), the first wireless earbud 112 may transmit a signal S414 to the second wireless earbud 114, including a message representing a status check or a status inquiry. One potential advantage of switching channels and sending the message (e.g., S410) at a partial slot (e.g., half slot of an even numbered slot) is efficient utilization of bandwidth. For example, in instances in which a responder wireless earbud (e.g., 114) has not missed any packets, the responder wireless earbud may provide a responsive status update at the next designated Tx slot (e.g., sometimes an odd numbered slot), after which both earbuds may return to the listening on the first communication channel 124 at the subsequent Rx slot (e.g. next even numbered slot), not having missed any Rx slots. In addition, switching at partial slots after listening on the first communication channel 124 may help to synchronize channel-switching with the transmission of audio data on the first communication channel 124. That is, if the switching is timed based on when audio data is not being received from the source device 122, then the wireless earbuds may be less likely to miss packets when switching. In other instances, an underlying hardware architecture may provide support for this type of scheme, in which the same switched-to communication channel may be used by the first wireless earbud 112 to check in with each of the other wireless earbuds.

Once the first wireless earbud 112 and the second wireless earbud 114 are on the same channel and exchanging data, additional operations may be executed to provide the second wireless earbud 114 with any missed packets. For example, the process 400 includes, at 416, the second wireless earbud 114 identifying any missed audio data. For example, the second wireless earbud 114 may identify the sequence number of the last fully received packet of audio data (e.g., last fully received packet received via passive receiving on the first communication channel 124). In addition, at 416, the second wireless earbud 114 may also compile a bitmap (e.g., of up to 64 bits representing 64 packets) representing any packets received after the sequence number and packets missed after the sequence number. For example, in the bitmap, a 1 may indicate a received packet and a 0 may represent a missed packet.

The second wireless earbud 114 transmits a signal S418, which the first wireless earbud 112 receives, at 420, and the signal S418 may include data indicating whether the second wireless earbud 114 missed any audio packets, and if so, which ones. For example, in the example provided by FIG. 3, the second wireless earbud 114 did not miss any packets included in signals S320, S326, or S332, and as such, the signal S418 may indicate to the first wireless device 112 that no packets were missed (e.g., acknowledgement (ACK) back). Alternatively, if the second wireless earbud 114 had missed any packets, the signal S418 may include the sequence number and the bitmap (if any), which the first wireless earbud 112 may use to retrieve missed audio and forward to the second wireless earbud 114. Once received by the second wireless earbud 114, the second wireless earbud 114 may transmit an ACK or other message indicating to the first wireless earbud 112 that the second wireless earbud 114 received the audio packets and triggering the first wireless earbud 112 to switch to another communication channel (e.g., back to the first communication channel 124).

In one aspect of the disclosure, while the first wireless earbud 112 is checking in with the second wireless earbud 114 (e.g., in the same slots), the third wireless earbud 118 is checking in with the fourth wireless earbud 120 using a similar partial-slot mechanism. By performing these operations in parallel, the multiple pairs of earbuds efficiently use bandwidth and time and may reduce the likelihood of data collisions, since the pairs are using different communication channels (e.g., different piconets) to check in. For example, at 422, the third wireless earbud 114 pauses the waiting to passively receive on the first communication channel 124 pursuant to a channel-switch setting (e.g., channel-switch setting 244) and switches to transmit to the fourth wireless earbud 120 on another communication channel (e.g., fourth communication channel 142). In one example, the third wireless earbud 118 pauses the waiting on the first communication channel 124 and switches channels part way through a duration of the slot at which the waiting began (e.g., partial-slot transition or half-slot transition). For example, if a slot is 625 microseconds, then the third wireless earbud 118 may wait to receive data on the first communication channel 124 for about 100 microseconds before switching channels (e.g., to the second communication channel 130) about 312.5 microseconds into the slot. The channel-switch setting may include various types of instructions. For example, in one aspect, the channel-switch setting may instruct the third wireless earbud 118 to change channel settings from receiving on the first communication channel 124 to transmitting on the fourth communication channel 142 during the first slot after audio data has been received from the source device 122.

In sync with the third wireless earbud 118, at 424, the fourth wireless earbud 120 pauses the waiting to passively receive data on the first communication channel 124 pursuant to a channel-switch setting (e.g., channel-switch setting 256) and switches to receive from the third wireless earbud 118 on the fourth communication channel 142. Similar to the third wireless earbud 118, the fourth wireless earbud 120 may pause the waiting to passively receive and switch channels part way through a duration of the slot at which the waiting began (e.g., partial-slot transition or half-slot transition). The third wireless earbud 118 and the fourth wireless earbud 120 may be synchronized based on the settings being synced at 314 and 318.

Using the switched-to channel (e.g., the fourth communication channel 142), the third wireless earbud 118 may transmit a signal S426 to the fourth wireless earbud 120, including a message representing a status check or a status inquiry. As indicated above, one potential advantage of switching channels and sending the message (e.g., S426) at a partial slot (e.g., half slot of an even numbered slot) is efficient utilization of bandwidth. In addition, switching at partial slots after listening on the first communication channel 124 may help to synchronize channel-switching with the transmission of audio data on the first communication channel 124, and reduce the likelihood of missing packets when switched away from waiting to passively receive data on the first communication channel 124.

Once the third wireless earbud 118 and the fourth wireless earbud 120 are on the same channel and exchanging data, additional operations may be executed to provide the fourth wireless earbud 120 with any missed packets that may have been passively received by the third wireless earbud 118. For example, the process 400 includes, at 428, the fourth wireless earbud 120 identifying any missed audio data. For example, the fourth wireless earbud 120 may identify the sequence number of the last fully received packet of audio data (e.g., last fully received packet received via passive receiving on the first communication channel 124). In addition, at 428, the fourth wireless earbud 120 may also compile a bitmap (e.g., of up to 64 bits representing 64 packets) representing any packets received after the sequence number and packets missed after the sequence number. For example, in the bitmap, a 1 may indicate a received packet and a 0 may represent a missed packet.

The fourth wireless earbud 120 transmits a signal S430, which the third wireless earbud 112 receives, at 432, and the signal S430 may include data indicating whether the fourth wireless earbud 120 missed any audio packets, and if so, which ones. For example, in the example provided by FIG. 3, the fourth wireless earbud 120 failed, at 330, to passively receive at least some of the audio packets in the signal S326, and at 338, the fourth wireless earbud 120 failed to passively receive at least some of the audio packets in the signal S332. As such, the signal S430 may include respective sequence number(s) and the bitmap(s), which the third wireless earbud 118 may, at 434, use to retrieve (e.g., from a buffer, such as a controller buffer or a circular buffer) missed audio and forward to the fourth wireless earbud 120 in a signal S436. For example, FIG. 3 indicates that the third wireless earbud passively received the audio data in the signal S326, and as such, the third wireless earbud 118 may forward a copy of that audio data to the fourth wireless earbud 120 in the signal S436. Once received by the fourth wireless earbud 120, the fourth wireless earbud 120 may transmit an ACK or other message indicating to the third wireless earbud 118 that the fourth wireless earbud 120 received the audio packets and triggering the third wireless earbud 118 to switch to another communication channel (e.g., back to the first communication channel 124). If the fourth wireless earbud 120 missed audio data (e.g., S332 in FIG. 3) that was also not passively received (or otherwise received) by the third wireless earbud 118, then the third wireless earbud 118 may still forward the missed audio data to the fourth wireless earbud 120 at a subsequent check in, such as after the third wireless earbud 118 has received that audio data from the first wireless earbud 112 (e.g., as described in FIGS. 4B, 4C, and 4D).

Referring to FIG. 4B, the process 400 continues after the first pair of wireless earbuds 112 and 114 have checked in using one piconet (e.g., the second communication channel 130), and the second pair of wireless earbuds 118 and 120 have checked in using another piconet (e.g., the fourth communication channel 142). In FIG. 4B, the first wireless earbud 112 and the third wireless earbud 118 may switch to a communication channel (e.g., the sixth communication channel 154) to exchange communications. For example, at 438, the first wireless earbud 112 detects an occurrence (e.g., start or end) of a programmed interval, such as a T_poll or an n-slot interval (e.g., 36-slot interval), where n is defined in the channel-switch settings 220. In parallel with the first wireless earbud 112, the third wireless earbud 118, at 440, detects an occurrence (e.g., start or end) of the programmed interval. As previously indicated, the channel-switch settings may be synced with the first wireless earbud 112, such that both the first wireless earbud 112 and the third wireless earbud 118 are detecting the same n-slot interval (e.g., T_poll dictating when to switch communication channels). The variable n may vary depending on a desired check-in frequency. For example, the periodic programmed interval may be timed independently of source-device transmissions, such that each interval of n slots is counted or starts regardless of what transmissions are currently being sent by the source device 122. In other instances, the periodic programmed interval may be based on when the source device 122 begins transmitting data (e.g., n slots after the source device starts transmitting audio data). In addition, the first wireless earbud 112 and the third wireless earbud 118 may each include a counter (e.g., Programmed Interval Counter (PIC)) or other module to track the passage of each slot and determine when a new programmed interval begins.

The process 400 includes, at 442, the first wireless earbud 112 switching, at the programmed interval (e.g., at the transition from a first programmed interval to a successive second programmed interval or when the first programmed interval lapses or when the successive second programmed interval begins), to a communication channel (e.g., the sixth communication channel 154) communicatively coupling the first wireless earbud 112 with the third wireless earbud 118. In parallel, at 444, the third wireless earbud 118 switches at the programmed interval to the communication channel communicatively coupling the first wireless earbud 112 with the third wireless earbud 118 (e.g., the sixth communication channel 154). For example, the first wireless earbud 112 and the third wireless earbud 118 may switch from the first communication channel 124 to the sixth communication channel 154 at similar instances irrespective of whether audio data is being received from the source device 122. The first wireless earbud 112 may then transmit a signal S446 to the third wireless earbud 118, including a message indicating a status check or status inquiry. At this stage in the process 400, the programmed interval is the trigger for switching to the sixth communication channel 154, as opposed to a partial slot after listening on the first communication channel. In this manner, the switching may be independent of transmitting or receiving occurring on the first communication channel 124, or at least timed more predictably (e.g., 20 slots after the source device transmits an audio packet). Among other things, using a programmed interval may provide more predictability as to when the wireless earbuds may switch channels, since the switching is not as directly tied to irregularly switching after waiting to receive or passively receive. In some instances, this timing may reduce a likelihood of interference. Once the first wireless earbud 112 and the third wireless earbud 118 are on the same channel and exchanging data, additional steps may be performed to forward missing packets.

In a further aspect, similar to signal exchanges described above, at 448, the third wireless earbud 118 identifies any missed audio data, such as by identifying the sequence number of the last fully received packet of audio data and compiling a bitmap representing any packets received after the sequence number and packets missed after the sequence number. The identified missed audio data may also include audio data missed by the fourth wireless earbud (as identified in the signal S430). For example, as indicated in FIG. 3, the third wireless earbud 118 missed at least some audio packets in the signal S320 and in the signal S332, and the fourth wireless earbud also missed at least some audio packets in the signal S332. The third wireless earbud transmits a signal S450 to the first wireless earbud 112 (e.g., as a status update) indicating any missed audio, and the first wireless earbud 112, at 452, receives the indication of any missed audio (e.g., the one or more sequence numbers and one or more bitmaps). After the first wireless earbud 112 receives the signal S450, the process 400 may include at least a couple of alternative operations further illustrated in FIGS. 4C and 4D.

Referring now to FIG. 4C, the process 400 may include one set of alternative operations for sharing audio that may be performed after the first wireless earbud 112 receives the signal S450. That is, in one example, while the first wireless earbud 112 and the third wireless earbud 118 are both still transmitting or receiving via the sixth communication channel 154 (e.g., as indicated in FIG. 4B and the related description), at 454, the first wireless earbud 112 compares the sequence number(s) and bitmap(s) to a buffer (e.g., controller buffer, circular buffer, etc.) to retrieve the missed audio data represented by a 0 in the bitmap(s). The first wireless earbud 112 transmits a signal S456, including the missed audio data, to the third wireless earbud 118, and the audio data may relate to packets missed by the third wireless earbud 118. After the third wireless earbud 118 acknowledges receipt of the signal S456, the wireless earbuds 112 and 118 may switch to another channel (e.g., return to waiting on the first communication channel 124 or checking in with another wireless earbud).

In one aspect of the disclosure, the fourth wireless earbud 120 may passively receive audio data (e.g., signal S456) transmitted from the first wireless earbud 112 to the third wireless earbud 118 using the sixth communication channel 154 (as indicated by the dashed signal line from the signal S456 to the fourth wireless earbud 120). For example, if the first wireless earbud 112 is forwarding, in the signal S456, a copy of the audio data that had been in signal S332, which was missed by both the third wireless earbud 118 and the fourth wireless earbud 120, then the fourth wireless earbud 120 may attempt to sniff the signal S456 to capture the missed audio data. However, in some instances, the fourth wireless earbud 120 may not have the hardware capabilities to passively receive audio data (e.g., sniff or listen) on both the first communication channel 124 and the sixth communication channel 154 between the first wireless earbud 112 and the third wireless earbud 118. Or the fourth wireless earbud 120 may still fail to receive all of the packets despite attempts to passively receive audio data transmitted on the sixth communication channel 154. As such, the process 400 may additionally include the third wireless earbud 118 and the fourth wireless earbud 120 engaging in another partial-slot check-in at a subsequent instant in time (e.g., after switching to passively receiving on the first communication channel 124) to provide another opportunity for the fourth wireless earbud 120 to request and receive the missed packets. For example, the third wireless earbud 118 and the fourth wireless earbud 120 may repeat the steps of the process 400 identified in FIG. 4A, in which case, the third wireless earbud 118 may transmit the signal S436 to the fourth wireless earbud 120, the signal S436 including a copy of the audio data that had been in signal S332.

Figure 4D:
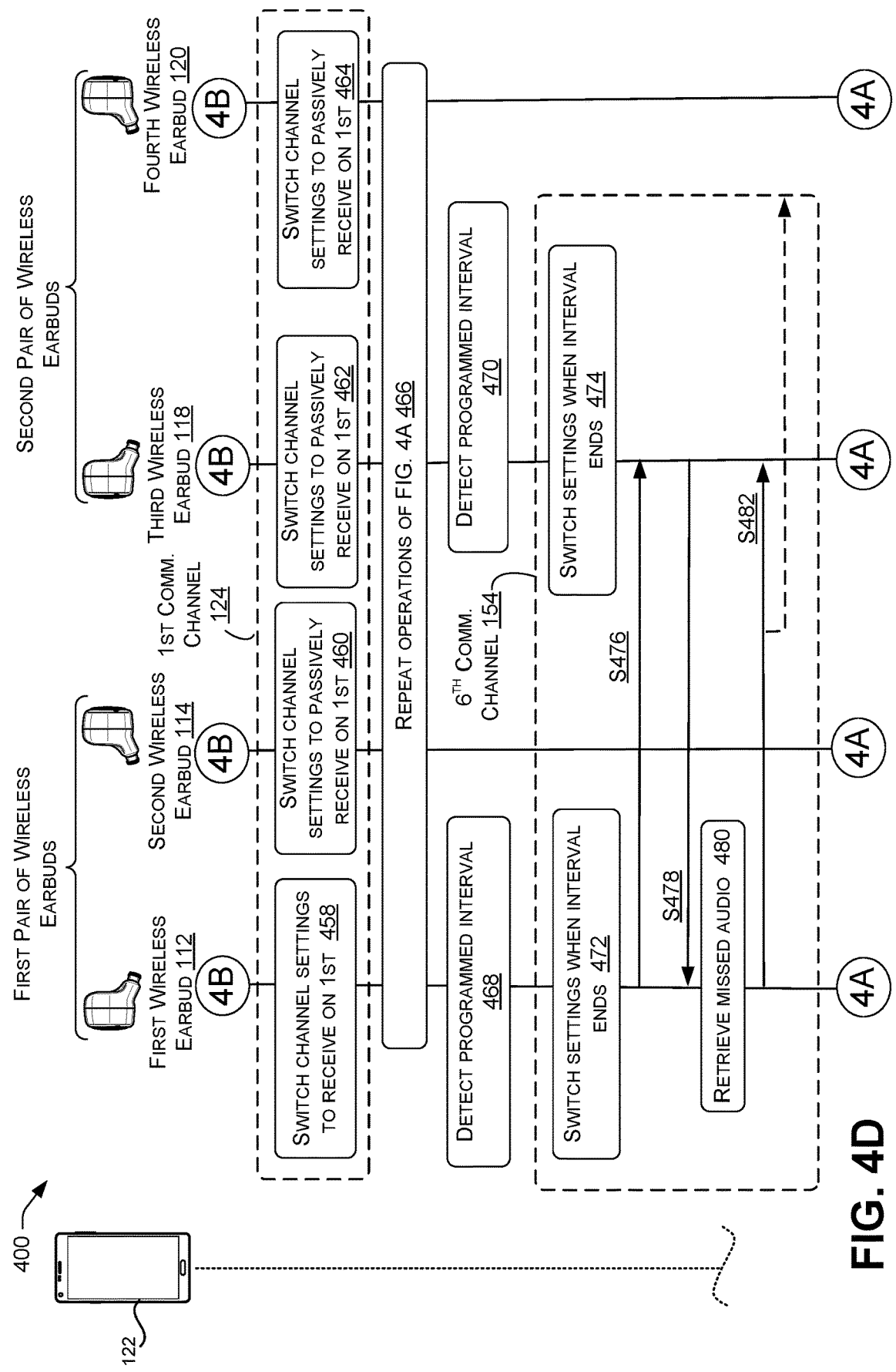

Referring now to FIG. 4D, another alternative set of operations are depicted that may be carried out as an alternative to the operations in FIG. 4C and that may facilitate the sharing of audio data originating from the source device 122. In FIG. 4D, after the first wireless earbud 112 receives the signal S450, the first wireless earbud 112 and the third wireless earbud 118 may change channel settings to no longer communicate via the sixth communication channel 154. At 458, the first wireless earbud 112 may change channel settings to exchange communications with the source device 122 on the first communication channel 124. Furthermore, at 460, 462, and 464, each of the second wireless earbud 114, the third wireless earbud 118, and the fourth wireless earbud 120 may change channel settings to passively receive audio data on the first communication channel 124. With each of the wireless earbuds 112, 114, 118, and 120 set to receive (e.g., directly or passively) audio data on the first communication channel 124, the operations depicted in FIG. 4A may be repeated at 466. For example, each of the earbuds may directly or passively receive audio data via the first communication channel 124; the first pair of wireless earbuds 112 and 114 may check in with one another via the second communication channel 130; and the second pair of wireless earbuds 118 and 120 may check in with one another via the fourth communication channel 142.

Continuing with FIG. 4D, the first wireless earbud 112 and the third wireless earbud 118 may switch to a communication channel (e.g., the sixth communication channel 154) to exchange communications. For example, at 468, the first wireless earbud 112 detects an occurrence (e.g., start or end) of a programmed interval, similar to the operations described with respect to 438 in FIG. 4B. Similarly, at 470, the third wireless earbud 118 also detects the programmed interval. At 442, the first wireless earbud 112 switches, at the programmed interval (e.g., at the transition from a first programmed interval to a successive second programmed interval or when the first programmed interval lapses or when the successive second programmed interval begins), to a communication channel (e.g., the sixth communication channel 154) communicatively coupling the first wireless earbud 112 with the third wireless earbud 118. In parallel, at 474, the third wireless earbud 118 switches at the programmed interval to the communication channel communicatively coupling the first wireless earbud 112 with the third wireless earbud 118 (e.g., the sixth communication channel 154).

Using the sixth communication channel 154, the first wireless earbud 112 and the third wireless earbud 118 exchange signals S476 and S478 to verify the communicative connection. Recall that the third wireless earbud 118 already provided an indication of missed audio data via the signal S450 that was received by the first wireless earbud at 452. At 480, the first wireless earbud 112 may compare the sequence number(s) and bitmap(s) to a buffer (e.g., controller buffer, circular buffer, etc.) to retrieve the missed audio data represented by a 0 in the bitmap(s). The first wireless earbud 112 transmits a signal S482, including the missed audio data, to the third wireless earbud 118, and the audio data may relate to packets missed by the third wireless earbud 118. After the third wireless earbud 118 acknowledges receipt of the signal S456, the wireless earbuds 112 and 118 may switch to another channel (e.g., return to waiting on the first communication channel 124 or checking in with another wireless earbud). As described with respect to FIG. 4C, the fourth wireless earbud 120 may passively receive the audio data in the signal S482 (as indicated by the dash-line arrow). In addition, or alternatively, the third wireless earbud 118 may provide the audio data in the signal S482 to the fourth wireless earbud 120 when the two earbuds subsequently check in with one another on the fourth communication channel 142, such as by the operations depicted in FIG. 4A.

The method 400 is extensible to more than two pairs of wireless earbuds. For example, audio data from the source device 122 may be shared with additional pairs of earbuds by providing the synchronization information, including a discrete communication channel between the first wireless earbud 112 and one of the earbuds in each additional pair. Furthermore, variations of the method 400 are described above, and hardware architecture and capabilities may factor into which operations or alternative solutions are executed. For example, in one solution described above, the fourth wireless earbud 120 sniffs on audio packets transmitted from the first wireless earbud 112 to the third wireless earbud 118, whereas in an alternative approach, the fourth wireless earbud 120 may wait to receive audio packets at a subsequent check in with the third wireless earbud 118. Among other things, the hardware of the fourth wireless earbud 120 may factor into which solution is executed (e.g., depending on whether the fourth wireless earbud 120 may sniff on multiple channels in this manner). In addition, FIG. 4C represents one possible set of operations, whereas FIG. 4D represents a different possible set of operations. But both FIGS. 4C and 4D are directed to the transmitting of missed audio data from the first wireless earbud 112 to the third wireless earbud 118, and the implementation of each may depend on the capabilities of the underlying hardware.

Referring now to FIG. 5A, FIG. 5A illustrates a signal diagram of another example process 500 for sharing audio provided via a wireless communication protocol (e.g., Bluetooth) by a source device 122. In particular, the process 500 includes elements related to the first wireless earbud 112 checking in with each of the second wireless earbud 114, the third wireless earbud 118, and the fourth wireless earbud 120, such as after the process 300 is executed or as a continuation of the process 300.

The process 500 may include some initial elements that are similar to the process 400, such as when the first wireless earbud 112 checks in with the second wireless earbud 114. The process 500 is different from the process 400 in the manner in which the first wireless earbud checks in with the third wireless earbud 118 and the fourth wireless earbud 120. For example, the process 500 includes, at 502, the first wireless earbud 112 waiting to receive data by way of the first communication channel 124 (e.g., via which the source device 122 transmits audio data). For instance, the first wireless earbud 112 may adjust settings (or leave settings if already set) to tune to a scheduled channel or frequency consistent with link data received from the source device 122 and prepare to receive any data (e.g., audio data) transmitted from the source device 122 on the first communication channel 124. In parallel, at 504, 506, and 508, the second wireless earbud 114, the third wireless earbud 118, and the fourth wireless earbud 120 are all set to passively receive (e.g., by listening or sniffing) data transmitted from the source device 122 on the first communication channel 124. In one example, the first wireless earbud 112, the second wireless earbud 114, the third wireless earbud 118, and the fourth wireless earbud 120 wait to receive data at the beginning of a slot (e.g., the next Rx slot after the signal S320 is received).

At 510, the first wireless earbud 112 pauses the waiting to receive on the first communication channel 124 pursuant to a channel-switch setting (e.g., channel-switch setting 220) and switches to transmit to the second wireless earbud 114 on another communication channel (e.g., second communication channel 130). In one example, the first wireless earbud 112 pauses the waiting on the first communication channel 124 and switches channels part way through a duration of the slot at which the waiting began (e.g., partial-slot transition or half-slot transition). For example, if a slot is 625 microseconds, then the first wireless earbud 112 may wait to receive data on the first communication channel 124 for about 100 microseconds before switching channels (e.g., to the second communication channel 130) about 312.5 microseconds into the slot.

In sync with the first wireless earbud 112, at 512, the second wireless earbud 114 pauses the waiting to passively receive data on the first communication channel 124 pursuant to a channel-switch setting (e.g., channel-switch setting 232) and switches to receive from the first wireless earbud 112 on the second communication channel 130. Similar to the first wireless earbud 112, the second wireless earbud 114 may pause the waiting to passively receive and switch channels part way through a duration of the slot at which the waiting began (e.g., partial-slot transition or half-slot transition). The first wireless earbud 112 and the second wireless earbud 114 may be synchronized based on the settings being synced at 306 and 312. In a further aspect, the third wireless earbud 118 and the fourth wireless earbud 120 may also, at 513a and 513b, change channel settings to the second communication channel 130 (e.g., based on the partial-slot timing), although in some instances, the first wireless earbud 112 may not actually communicate any data directly to the third wireless earbud 118 or the fourth wireless earbud 120, at least not at this point in the process 500. In this sense, there may be less precise timing or synchronization between the first wireless earbud 112 and the other wireless earbuds 114, 118, and 120, such that the other wireless earbuds automatically switch to the second communication channel 130 according to the partial-slot timing/mechanism, regardless of whether the first wireless earbud 112 exchanges communications directly with the earbud during those slots.

Using the switched-to channel (e.g., the second communication channel 130), the first wireless earbud 112 may transmit a signal S514 to the second wireless earbud 114, including a message representing a status check or a status inquiry. At 516, the second wireless earbud 114 identifies any missed audio data. For example, the second wireless earbud 114 may identify the sequence number of the last fully received packet of audio data (e.g., last fully received packet received via passive receiving on the first communication channel 124) and compile a bitmap (e.g., of up to 64 bits representing 64 packets) representing any packets received after the sequence number and packets missed after the sequence number. The second wireless earbud 114 transmits a signal S518, which the first wireless earbud 112 receives, at 520, and the signal S518 may include data indicating whether the second wireless earbud 114 missed any audio packets, and if so, which ones. For example, in the example provided by FIG. 3, the second wireless earbud 114 did not miss any packets included in signals S320, S326, or S332, and as such, the signal S518 may indicate to the first wireless device 112 that no packets were missed (e.g., acknowledgement (ACK) back). Alternatively, if the second wireless earbud 114 had missed any packets, the signal S518 may include the sequence number and the bitmap (if any), which the first wireless earbud 112 may use to retrieve missed audio and forward to the second wireless earbud 114. Once the check-in between the first wireless earbud 112 and the second wireless earbud 114 is complete (e.g., the first wireless earbud 112 receives an ACK), the wireless earbuds 112 and 114 may switch to another communication channel (e.g., back to the first communication channel 124), and as depicted in FIG. 5A, the process 500 continues with FIG. 5B.

Referring to FIG. 5B, each of the first wireless earbud 112 (at 522), the second wireless earbud 114 (at 524), the third wireless earbud 118 (at 526), and the fourth wireless earbud 120 (at 528) may check back on the first communication channel 124 to receive (or passively receive) any audio data from the source device 122 (e.g., at the beginning of a slot, such as the next Rx slot after the first wireless earbud 112 and the second wireless earbud 114 switch from the second communication channel 130). When no audio data is receive from the source device 122, at 530, the first wireless earbud 112 pauses the waiting to receive on the first communication channel 124 pursuant to a channel-switch setting (e.g., channel-switch setting 220) and switches to transmit to the third wireless earbud 118 on another communication channel (e.g., the sixth communication channel 154). In one example, the first wireless earbud 112 pauses the waiting on the first communication channel 124 and switches channels part way through a duration of the slot at which the waiting began (e.g., partial-slot transition or half-slot transition). The second communication channel 130 and the sixth communication channel 154 may be identified differently to designate that the second communication channel 130 is used to transmit data between the first wireless earbud 112 and the second wireless earbud, while the sixth communication channel 154 is used to transmit data between the first wireless earbud 112 and the third wireless earbud 118. In one aspect of the disclosure, the second communication channel 130 and the sixth communication channel 154 may be include the same piconet that is used at different time instances.

In sync with the first wireless earbud 112, at 532, the third wireless earbud 118 pauses the waiting to passively receive data on the first communication channel 124 pursuant to a channel-switch setting (e.g., channel-switch setting 244) and switches to receive from the first wireless earbud 112 on the sixth communication channel 154. Similar to the first wireless earbud 112, the third wireless earbud 118 may pause the waiting to passively receive and switch channels part way through a duration of the slot at which the waiting began (e.g., partial-slot transition or half-slot transition). Furthermore, as described with respect to FIG. 5A, at 533a and 533b, the second wireless earbud 112 and the fourth wireless earbud 120 may also change channel settings to the sixth communication channel 154 (e.g., based on the partial-slot timing), although in some instances, the first wireless earbud 112 may not communicate any data directly to the second wireless earbud 114 or the fourth wireless earbud 120, at least not at this point in the process 500.

Using the switched-to channel (e.g., the sixth communication channel 154), the first wireless earbud 112 may transmit a signal S534 to the third wireless earbud 118, including a message representing a status check or a status inquiry. At 536, the third wireless earbud 118 identifies any missed audio data. For example, the third wireless earbud 118 may identify the sequence number of the last fully received packet of audio data (e.g., last fully received packet received via passive receiving on the first communication channel 124) and compile a bitmap (e.g., of up to 64 bits representing 64 packets) representing any packets received after the sequence number and packets missed after the sequence number. In the example provided by FIG. 3, the third wireless earbud 118 missed at least some audio packets in the signal S320 and in the signal S332. The third wireless earbud 118 transmits a signal S538, which the first wireless earbud 112 receives, at 540, and the signal S538 may include data indicating whether the third wireless earbud 118 missed any audio packets, and if so, which ones (e.g., the audio packets missed in the signal S320 and in the signal S332). At 542, the first wireless earbud 112 retrieves (e.g., from a buffer) any audio that was missed by the third wireless earbud 118. For example, the first wireless earbud 112 may compare the sequence number and bitmap to a buffer (e.g., controller buffer, circular buffer, etc.) to retrieve the missed audio data represented by a 0 in the bitmap. According to FIG. 3, the first wireless earbud 112 may have already received the audio data at 322 and 334 in the process 300 and may retrieve copies to be forwarded to the third wireless earbud 118. The first wireless earbud 112 transmits a signal S544, including the missed audio data, to the third wireless earbud 118.

In one aspect of the disclosure, the fourth wireless earbud 120 may listen or sniff the communication channel between the first wireless earbud 112 and the third wireless earbud 118 to try and passively receive any missed audio-data packets. However, in some instances, the audio data forwarded from the first wireless earbud 112 to the third wireless earbud 118 may not include the same packets missed by the fourth wireless earbud 120; the fourth wireless earbud 120 may not have the hardware capabilities to sniff on both the first communication channel and the communication channel between the first wireless earbud 112 and the third wireless earbud 118; and/or the fourth wireless earbud 120 may still fail to receive all of the packets despite sniffing efforts. As such, the process 500 may proceed, as indicated in FIG. 5C, to include operations by which the first wireless earbud 112 checks in with the fourth wireless earbud 120.

FIG. 5C depicts steps in the process including the first wireless earbud 112 checking in with the fourth wireless earbud 120 using timing and synchronization similar to the check-in process with the third wireless earbud 118. For example, each of the first wireless earbud 112 (at 546), the second wireless earbud 114 (at 548), the third wireless earbud 118 (at 550), and the fourth wireless earbud 120 (at 552) may first check back on the first communication channel 124 to receive (or passively receive) any audio data from the source device 122 (e.g., at the beginning of a slot). When no audio data is receive from the source device 122, at 554, the first wireless earbud 112 pauses the waiting to receive on the first communication channel 124 pursuant to a channel-switch setting (e.g., channel-switch setting 220) and switches to transmit to the fourth wireless earbud 120 on another communication channel (e.g., seventh communication channel 160). In one example, the first wireless earbud 112 pauses the waiting on the first communication channel 124 and switches channels part way through a duration of the slot at which the waiting began (e.g., partial-slot transition or half-slot transition). The second communication channel 130, the sixth communication channel 154, and the seventh communication channel 160 may be identified differently to designate a channel used by the first wireless earbud to communicate with the second wireless earbud 114, the third wireless earbud 118, and the fourth wireless earbud 120, respectively. In one aspect of the disclosure, the second communication channel 130, the sixth communication channel 154, and the seventh communication channel 160 may include the same piconet that is used at different time instances by the first wireless earbud 112 to communicate with different wireless earbuds.

In sync with the first wireless earbud 112, at 556, the fourth wireless earbud 120 pauses the waiting to passively receive data on the first communication channel 124 pursuant to a channel-switch setting (e.g., channel-switch setting 256) and switches to receive from the first wireless earbud 112 on the seventh communication channel 160. Similar to the first wireless earbud 112, the fourth wireless earbud 120 may pause the waiting to passively receive and switch channels part way through a duration of the slot at which the waiting began (e.g., partial-slot transition or half-slot transition). Furthermore, as described with respect to FIGS. 5A and 5B, at 557a and 557b, the second wireless earbud 112 and the third wireless earbud 118 may also change channel settings to the seventh communication channel 154 (e.g., based on the partial-slot timing), although in some instances, the first wireless earbud 112 may not communicate any data directly to the second wireless earbud 114 or the third wireless earbud 118, at least not at this point in the process 500.

Using the switched-to channel (e.g., the seventh communication channel 160), the first wireless earbud 112 may transmit a signal S558 to the fourth wireless earbud 120, including a status check or status inquiry. The process 500 includes, at 560, the fourth wireless earbud 120 identifies any missed audio data. For example, the fourth wireless earbud 120 may identify the sequence number of the last fully received packet of audio data (e.g., last fully received packet received via passive receiving on the first communication channel 124) and compile a bitmap (e.g., of up to 64 bits representing 64 packets) representing any packets received after the sequence number and packets missed after the sequence number. In the example provided by FIG. 3, the fourth wireless earbud 120 missed at least some audio packets in the signal S326 and in the signal S332. The fourth wireless earbud 118 transmits a signal S562, which the first wireless earbud 112 receives, at 564, and the signal S562 may include data indicating whether the fourth wireless earbud 120 missed any audio packets, and if so, which ones (e.g., the audio packets missed in the signal S326 and in the signal S332). At 566, the first wireless earbud 112 retrieves (e.g., from a buffer) any audio that was missed by the fourth wireless earbud 120 (e.g., as indicated in the signal S562). For example, the first wireless earbud 112 may compare the sequence number and bitmap to a buffer (e.g., controller buffer, circular buffer, etc.) to retrieve the missed audio data represented by a 0 in the bitmap. According to FIG. 3, the first wireless earbud 112 may have already received the audio data at 328 and 334 in the process 300 and may retrieve copies to be forwarded to the fourth wireless earbud 120. The first wireless earbud 112 transmits a signal S568, including the missed audio data, to the fourth wireless earbud 120. After the fourth wireless earbud 120 acknowledges receipt of the signal S568, the wireless earbuds 112 and 120 may return to waiting to receive data on the first communication channel 124.

The method 500 is extensible to more than two pairs of wireless earbuds or more than four wireless earbuds or more than four speakers. For example, audio data from the source device 122 may be shared with additional pairs of earbuds or speakers by providing the synchronization information. Each of the wireless earbuds or speakers may switch over to the second communication channel (e.g., piconet different from the piconet between the first wireless earbud and the source device 122) according to the partial-slot timing and the first wireless earbud or speaker may sequentially check in with each earbud or speaker.

Figure 6:
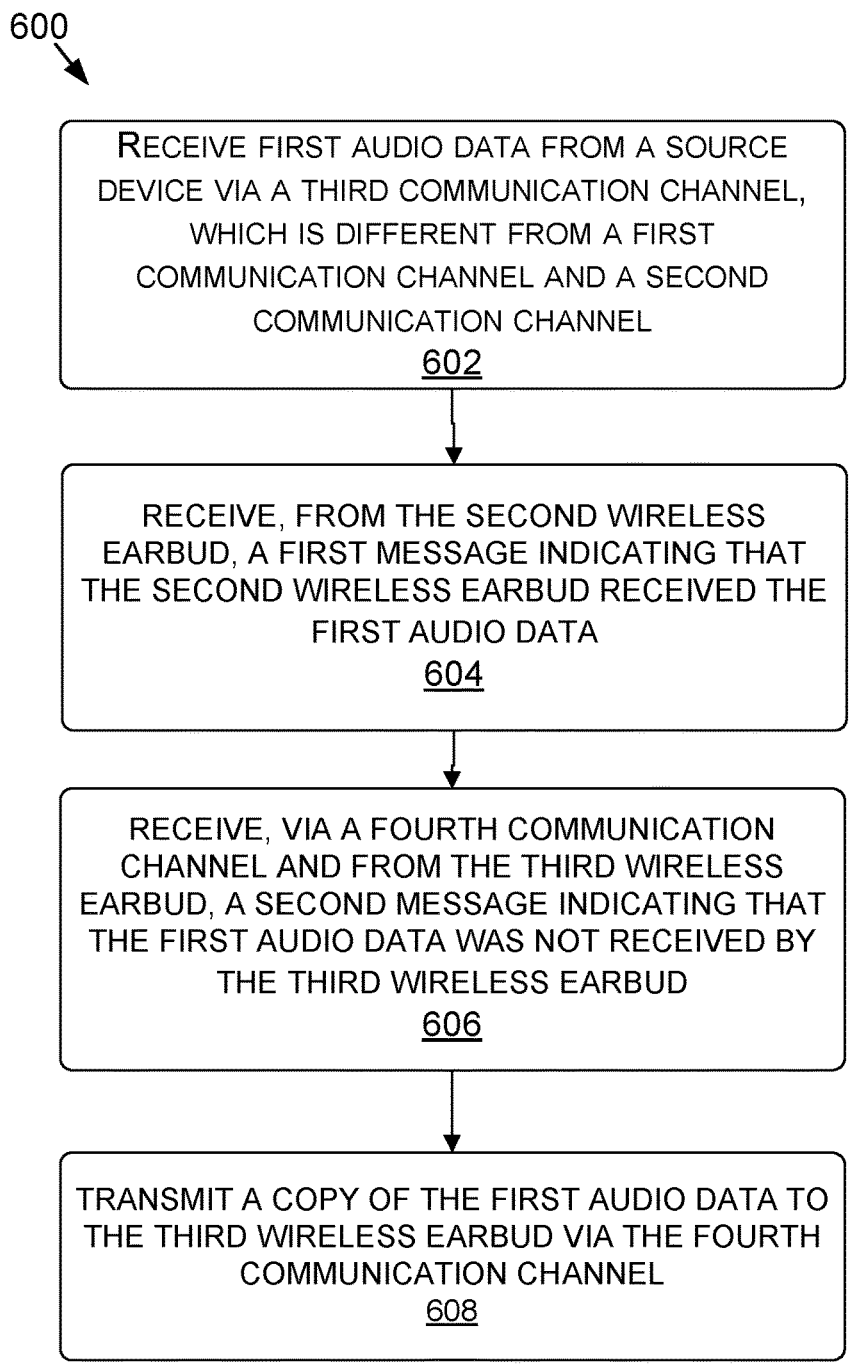
FIGS. 6, 7, and 8 each illustrates a flow diagram of a method for sharing audio data among pairs of earbuds.
Figure 7:
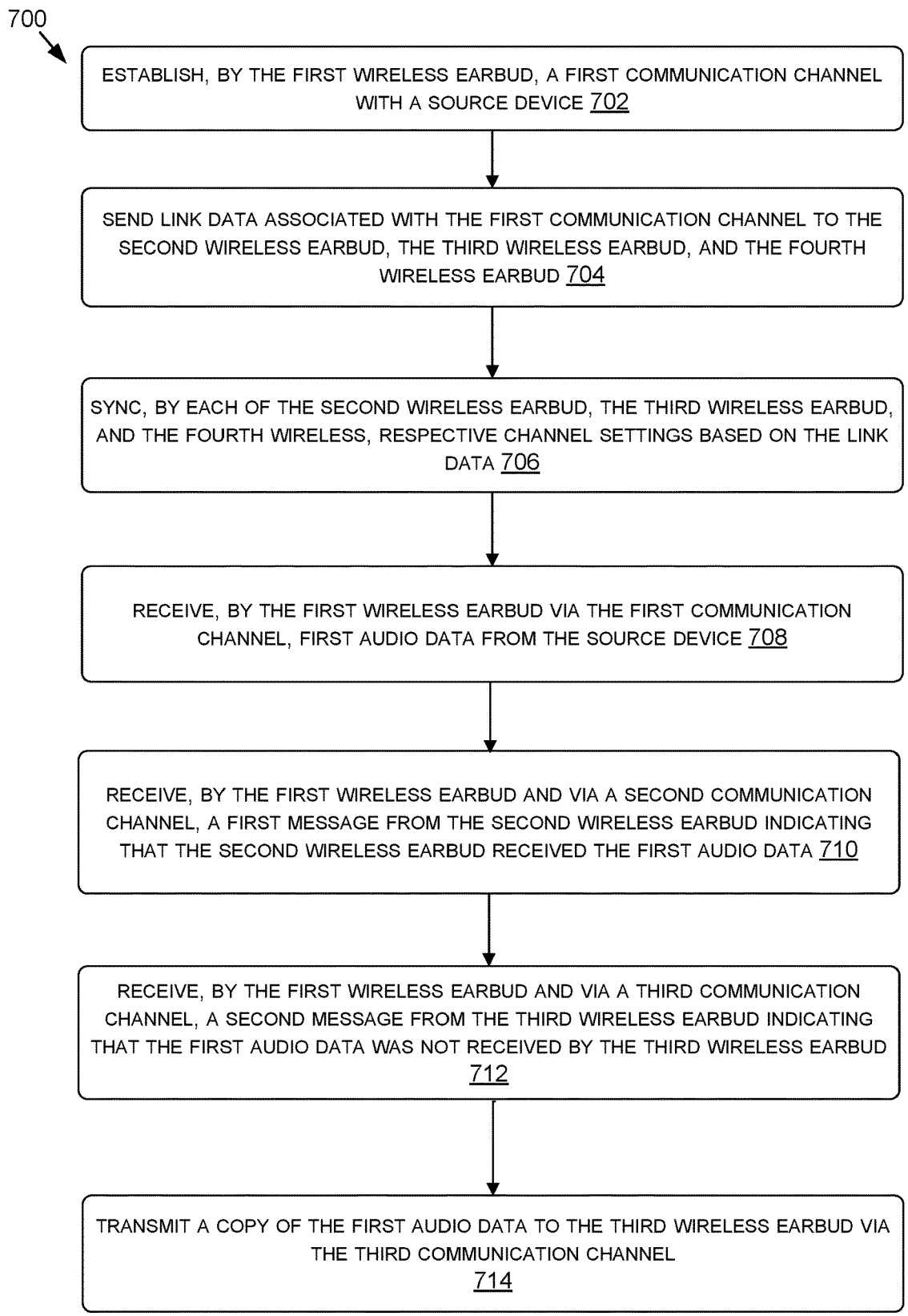
Figure 8:
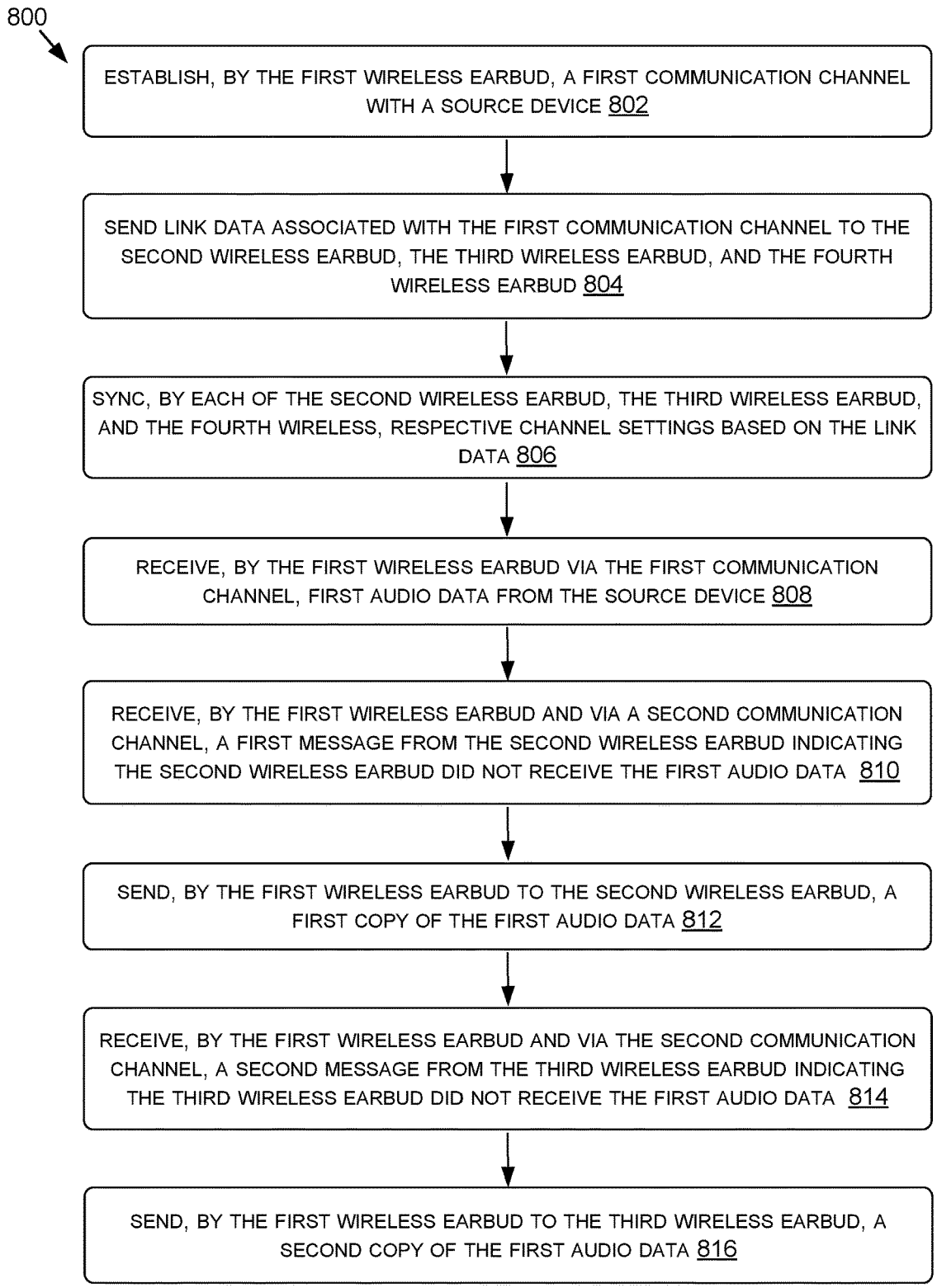

Now referring to FIGS. 6-8, methods 600, 700, and 800 are depicted, and each block of the methods 600, 700, and 800 comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application and a part of a larger application. In addition, methods 600, 700, and 800 are described, by way of example, with respect to the elements in FIGS. 1, 2, 3, 4A, 4B, 5A, 5B, and 5C. However, this method may additionally or alternatively be executed by any one system, or any combination of systems, including, but not limited to, those described herein.

FIG. 6 is a flow diagram showing a method 600 for sharing audio provided by a source device. For example, the method 600 may be performed by an audio system including a first pair of wireless earbuds comprising a first wireless earbud (e.g., 112) and a second wireless earbud (e.g., 114) that exchange data via a first communication channel (e.g., 130). The audio system may also include a second pair of wireless earbuds comprising a third wireless earbud (e.g., 118) and a fourth wireless earbud (e.g., 120) that exchange data via a second communication channel (e.g., 142), which is different from the first communication channel.

The method 600, at operation 602, includes receiving first audio data from a source device via a third communication channel, which is different from the first communication channel and the second communication channel. For example, the first wireless earbud 112 may receive first audio data S320, S326, and/or S332 from the source device 122 via a communication channel 124, which is different from the communication channel 130 and different from the communication channel 142.

The method 600, at operation 604, includes receiving, from the second wireless earbud, a first message indicating that the second wireless earbud received the first audio data. For example, the first wireless earbud 112 may exchange, via the communication channel 130, messages S414 and S418 indicating whether the second wireless earbud 114 passively received the first audio data S320, S326, and/or S332.

The method 600, at operation 606, includes receiving, via a fourth communication channel and from the third wireless earbud, a second message indicating that the first audio data was not received by the third wireless earbud. For example, the first wireless earbud 112 may exchange, via the communication channel 154 and with the third wireless earbud 118, second messages S446 and S450 indicating that the first audio data S320 and S332 was not passively received by the third wireless earbud 118.

The method 600, at operation 608, includes transmitting a copy of the first audio data to the third wireless earbud via the fourth communication channel. For example, the first wireless headphone 112 may transmit a copy of the first audio data S456 to the third wireless earbud 118 via the communication channel 154.

FIG. 7 is a flow diagram showing a method 700 for sharing audio data among a first pair of wireless earbuds, which includes a first wireless earbud and a second wireless earbud, and a second pair of wireless earbuds, which includes a third wireless earbud and a fourth wireless earbud. For example, audio data may be shared among a first pair of wireless earbuds, which includes a first wireless earbud 112 and a second wireless earbud 114, and a second pair of wireless earbuds, which includes a third wireless earbud 118 and a fourth wireless earbud 120.

The method 700, at operation 702, includes establishing, by the first wireless earbud, a first communication channel with a source device. For example, the first wireless earbud 112 may exchange data (e.g., link data 126, device ID, etc.) with the source device 122 and adjust settings communicate using the first communication channel 124.

The method 700, at operation 704, includes sending link data associated with the first communication channel to the second wireless earbud, the third wireless earbud, and the fourth wireless earbud. For example, link data 134 may be forwarded to the second wireless earbud 114 in the signal S308, and link data 156 may be forwarded to the third wireless earbud 118 in the signal S310. In addition, the link data 146 may be forwarded (e.g. from the third wireless headphone 118) to the fourth wireless earbud 120 in the signal S316, or the link data 162 may be forwarded from the first wireless earbud 112 to the fourth wireless earbud 120.

The method 700, at operation 706, includes synchronizing, by each of the second wireless earbud, the third wireless earbud, and the fourth wireless, respective channel settings based on the link data. For example, the second wireless earbud 114 may sync settings at 312; the third wireless earbud 118 may sync settings at 314; and the fourth wireless earbud 120 may sync settings at 318.

The method 700, at operation 708, includes receiving, by the first wireless earbud via the first communication channel, first audio data from the source device. For example, the first wireless earbud 112 receives via the communication channel 124 the first audio data S320, S326, and S332 from the source device 122. At that time, and the second wireless earbud 112, the third wireless earbud 118, and the fourth wireless earbud 120 may be set to passively receive (as depicted by the dash-line arrows in FIG. 3) the first audio data based on syncing to the first communication channel 124.

The method 700, at operation 710, includes receiving, by the first wireless earbud and via a second communication channel, a first message from the second wireless earbud indicating that the second wireless earbud received the first audio data. For example, the first wireless earbud 112 may exchange, via the communication channel 130, messages S414 and S418 indicating whether the second wireless earbud 114 passively received the first audio data S320, S326, and/or S332, including the message in signal S418 that may indicate the second wireless earbud 114 received the audio data.

The method 700, at operation 712, includes receiving, by the first wireless earbud and via a third communication channel, a second message from the third wireless earbud indicating that the first audio data was not received by the third wireless earbud. For example, the first wireless earbud 112 may exchange, via the communication channel 154 and with the third wireless earbud 118, second messages S446 and S450 indicating that the first audio data S320 and S332 was not passively received by the third wireless earbud 118, including the message in signal S450 that may indicate audio data was not received.

The method 700, at operation 714, includes transmitting, by the first wireless earbud and via the third communication channel, a copy of the first audio data to the third wireless earbud. For example, the first wireless headphone 112 may transmit a copy of the first audio data S456 to the third wireless earbud 118 using the communication channel 154.

FIG. 8 is a flow diagram showing a method 800 for sharing audio data among a first pair of wireless earbuds, which includes a first wireless earbud and a second wireless earbud, and a second pair of wireless earbuds, which includes a third wireless earbud and a fourth wireless earbud. For example, audio data may be shared among a first pair of wireless earbuds, which includes a first wireless earbud 112 and a second wireless earbud 114, and a second pair of wireless earbuds, which includes a third wireless earbud 118 and a fourth wireless earbud 120.

The method 800, at operation 802, includes establishing, by the first wireless earbud, a first communication channel with a source device. For example, the first wireless earbud 112 may exchange data (e.g., link data 126, device ID, etc.) with the source device 122 and adjust settings communicate using the first communication channel 124.

The method 800, at operation 804, includes sending link data associated with the first communication channel to the second wireless earbud, the third wireless earbud, and the fourth wireless earbud. For example, link data 134 may be forwarded to the second wireless earbud 114 in the signal S308, and link data 156 may be forwarded to the third wireless earbud 118 in the signal S310. In addition, the link data 146 may be forwarded (e.g. from the third wireless headphone 118) to the fourth wireless earbud 120 in the signal S316, or the link data 162 may be forwarded from the first wireless earbud 112 to the fourth wireless earbud 120.

The method 800, at operation 806, includes synchronizing, by each of the second wireless earbud, the third wireless earbud, and the fourth wireless, respective channel settings based on the link data. For example, the second wireless earbud 114 may sync settings at 312; the third wireless earbud 118 may sync settings at 314; and the fourth wireless earbud 120 may sync settings at 318.

The method 800, at operation 808, includes receiving, by the first wireless earbud via the first communication channel, first audio data from the source device. For example, the first wireless earbud 112 receives via the communication channel 124 the first audio data S320, S326, and S332 from the source device 122. At that stage, the second wireless earbud 112, the third wireless earbud 118, and the fourth wireless earbud 120 may be set to passively receive (as depicted by the dash-line arrows in FIG. 3) the first audio data based on syncing to the first communication channel 124.

The method 800, at operation 810, includes receiving, by the first wireless earbud and via a second communication channel, a first message from the second wireless earbud indicating the second wireless earbud did not receive the first audio data. For example, the first wireless earbud 112 may exchange, via the communication channel 130, messages S514 and S518 indicating whether the second wireless earbud 114 passively received the first audio data S320, S326, and/or S332. If the second wireless earbud 114 fails to passively receive any of the first audio data (e.g., when sniffing), then the first wireless earbud 112 may forward a copy of the first audio data that was missed using the communication channel 130 (e.g., see message exchange in FIG. 5A between the first wireless earbud 112 and the second wireless earbud 114). For example, at operation 812, the method 800 includes sending, by the first wireless earbud to the second wireless earbud, a first copy of the first audio data.

The method 800, at operation 814, includes receiving, by the first wireless earbud and via the second communication channel, a second message from the third wireless earbud indicating the third wireless earbud did not receive the first audio data. For example, the first wireless earbud 112 may exchange, via the communication channel 154 (which may be the same piconet as communication channel 130, just at a different time period), messages S534 and S538 indicating whether the third wireless earbud 118 passively received the first audio data S320, S326, and/or S332. If the third wireless earbud 114 fails to passively receive any of the first audio data (e.g., when sniffing), then the first wireless earbud 112 may forward a copy of the first audio data S544 that was missed using the communication channel 130 (e.g., see message exchange in FIG. 5B between the first wireless earbud 112 and the second wireless earbud 118). For example, at 816, the method 800 includes sending, by the first wireless earbud to the third wireless earbud, a second copy of the first audio data.

Figure 9:
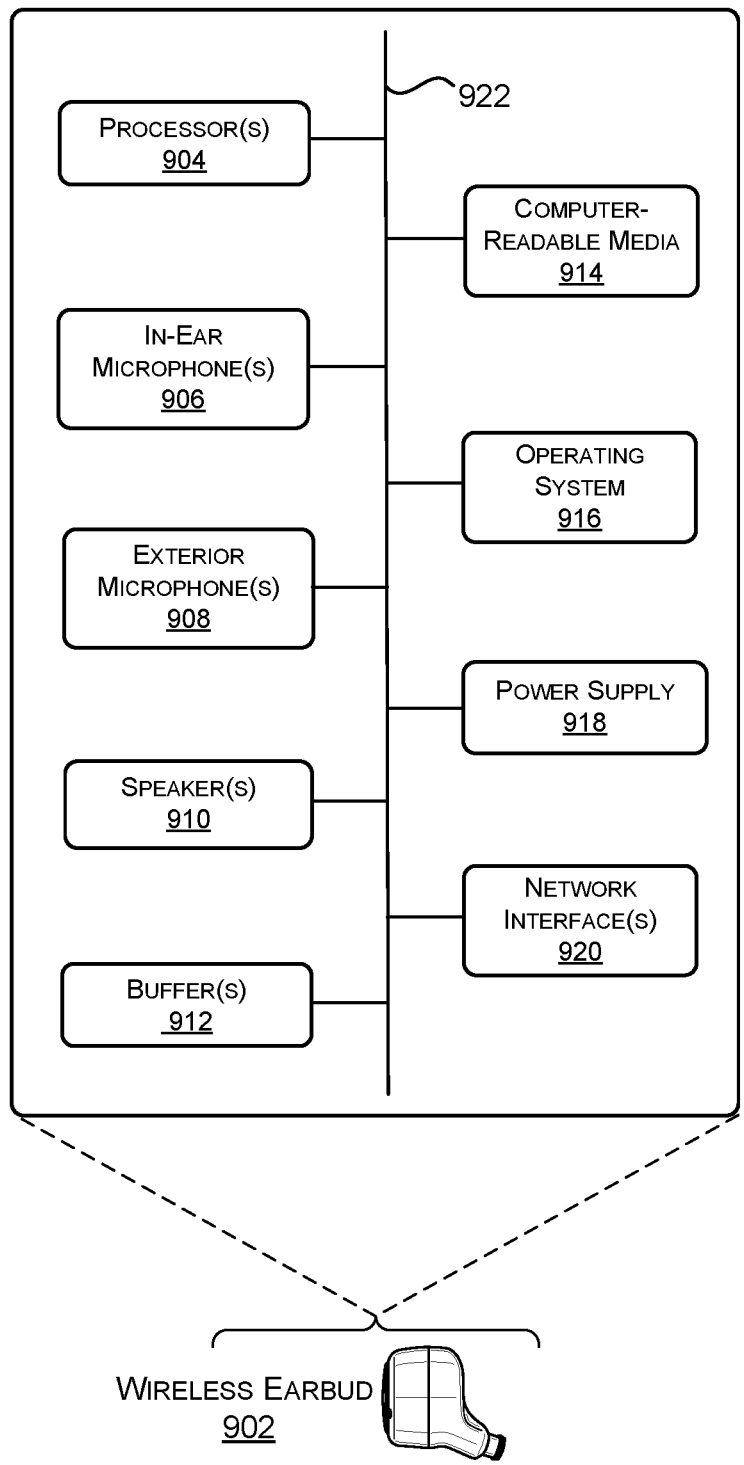
FIG. 9 illustrates a block diagram of an example architecture of wireless headphone that includes components for some of the techniques described herein.

FIG. 9 illustrates a block diagram of an example architecture of a wireless earbud 902 (e.g., the first wireless earbud 112, the second wireless earbud 114, the third wireless earbud 118, or the fourth wireless earbud 120), including components that may be usable in implementing aspects of this disclosure (e.g., sharing audio provided by a source device). The wireless earbud 902 may include an interconnect system 922 that directly or indirectly couples the following devices: processor(s) 904, in-ear microphone(s) 906, exterior microphone(s) 908, speaker(s) 910, buffer(s), computer-readable media 914, operating system 916, power supply 918, and network interface(s) 920.

Although the various blocks of FIG. 9 are shown as connected via the interconnect system 922 with lines, this is not intended to be limiting and is for clarity only. For example, one or more components may be combined or one of the components may include multiple components. The interconnect system 922 may represent one or more links or busses, such as an address bus, a data bus, a control bus, or a combination thereof. The interconnect system 922 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. In other instances, components are indirectly connected.

The wireless earbud 902 may include any type of computing device that may be positioned in, on, and/or around an ear of a user (e.g., the user 110 or the user 116) or otherwise associated with an ear the user. In the illustrated implementation, the wireless earbud 902 includes one or more processors 904 (e.g., processors 210, 222, 234, or 246) configured to power various components of the wireless earbud 902 and/or perform operations of the wireless earbud 902. Further, the wireless earbud 902 may include various hardware-based components, such as one or more in-ear microphones 906, one or more exterior microphones 908, one or more speaker(s) 910 (e.g., the speaker 214, 226, 238, or 250), one or more acoustic isolation components, and one or more buffers 912.

The in-ear microphone(s) 906 and exterior microphone(s) 908 may function as input devices to receive audio input, such as a voice command from a user (e.g., the user 110 or the user 116). The in-ear microphone(s) 906 and exterior microphone(s) 908 may comprise any type of component, such as a transducer, which converts sound into an electrical signal (e.g., audio data). The in-ear microphone(s) 906 may be positioned on or in the wireless earbud 902 such that the in-ear microphone(s) 906 are able to detect and capture in-ear sound emitting from the ear canal of the user's ear. The exterior microphone(s) 908 may be positioned on or in the wireless earbud 902 such that the exterior microphone(s) 908 are able to detect and capture exterior sound emitting from an environment surrounding the user. The speaker(s) 910 (e.g., in-ear speaker(s)) may function as an output device to output audio sounds corresponding to audio data, which may be stored in the buffer(s) 912 of the wireless earbud 902, another memory location, and/or be received from another computing device communicatively coupled to the wireless earbud 902. In some examples, the speaker(s) 910 may emit audible statements to communicate with the user, and the user may respond or otherwise issue voice commands, which may be captured by the microphone(s) 906 and/or 908. Thus, the speaker(s) 910 may be used in conjunction with the microphone(s) 906 and/or 908 to facilitate a conversation with the user. The speaker(s) 910 may output various types of audio data, such as audio data from a phone call (e.g., a phone call conducted through the source device 122 and communicated to the wireless earbud 902 using a wireless network), music audio data (e.g., 126), or any other type of audio data.

The wireless earbud 902 may further include the buffer(s) 912 for storing, at least temporarily, various types of data. For instance, if the wireless earbud 902 is outputting audio data using the speaker(s) 910, the buffer(s) 912 may store portions of the audio data prior to outputting the audio data. By storing audio data in the buffer(s) 912, the wireless earbud 902 may perform various types of operations. For example, when replying to a status inquiry (e.g., S414, S426, S514, S534, or S558) the wireless earbud 902 may reference the buffer(s) 912 to determine a sequence number of a last fully received audio packet and a bitmap representing any packets that were not received. In another example, the wireless earbud 902 may reference the buffer(s) 912 to copy audio data that is identified in a status update (e.g., S418, S430, S450, S518, S538, or S562), so the wireless earbud 902 may forward a copy of the audio data to another wireless earbud that missed the packets. As another example, the buffer(s) 912 may store exterior audio data generated by the exterior microphone(s) 908 that represents the exterior sound. The exterior audio data may be used for various purposes, such as for performing active acoustic isolation to reduce the amount of exterior sound 122 that reaches the in-ear microphones(s) 116.

The wireless earbud 902 may further include computer-readable media 914, which stores various software components, firmware components, or combinations thereof. The components stored in the computer-readable media 914 may comprise computer-readable instructions (e.g., software, firmware, a combination thereof, etc.), which configure the processor(s) 904 to perform various operations. The computer-readable media 914 may store an operating system 916 configured to manage hardware, software, firmware, and/or other systems and services within and coupled to the wireless earbud 902. The computer-readable media 914 may additionally store one or more applications, such as music playing applications, telephone call conducting applications, or any other type of applications appropriate for a wireless earbud 902. The applications may be configured to play songs or other audio data/files by causing the processor(s) 904 to output audio data using the in-ear speaker(s) 910.

The wireless earbud 902 may be powered, at least partially, be an internal power supply 918. For instance, the wireless earbud 902 may include one or more of batteries, battery banks, supercapacitors, rechargeable batteries, or any other type of internal power supply which may be charged using mains-power and provide power to the wireless earbud 902.

The wireless earbud 902 may further include one or more network interfaces 920 that may be utilized by the wireless earbud 902 to communicate with other devices over networks, such as the network(s) 124, 130, 132, 142, 144, 154, and 156. Generally, the network interface(s) 920 enable the wireless earbud 902 to communicate over any type of network, such as a wired network (e.g., USB, Auxiliary, cable etc.), as well as wireless networks (e.g., Wi-Fi, Bluetooth, Personal Area Networks, Wide Area Networks, and so forth). In some examples, the network interface(s) 920 may include a wireless unit coupled to an antenna to facilitate wireless connection to a network. However, the network interface(s) may include any type of component (e.g., hardware, software, firmware, etc.) usable by the wireless earbud 902 to communicate over any type of wired or wireless network. The network interface(s) 920 may enable the wireless earbud 902 to communicate over networks such as a wireless or Wi-Fi network communications interface, an Ethernet communications interface, a cellular network communications interface, a Bluetooth communications interface, etc., for communications over various types of networks, including wide-area network, local-area networks, private networks, public networks etc. In the case of a wireless communications interfaces, such network interface(s) 920 may include radio transceivers and associated control circuits and logic for implementing appropriate communication protocols.

In some implementations, the processors(s) 904 may include a central processing unit (CPU), a graphics processing unit (GPU), both CPU and GPU, a microprocessor, a digital signal processor and/or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processors(s) 904 may possess its own local memory, which also may store program modules, program data, and/or one or more operating systems. The processors(s) 904 may be located in a single device or system, or across disparate devices or systems, which may be owned or operated by various entities.

The computer-readable media 914 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 914 may be implemented as computer-readable storage media ("CRSM"), which may be any available physical media accessible by the processor(s) 904 to execute instructions stored on the memory 904. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processors(s) 904.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method of sharing audio data among a first pair of wireless earbuds, which includes a first wireless earbud and a second wireless earbud, and a second pair of wireless earbuds, which includes a third wireless earbud and a fourth wireless earbud, the method comprising:
    establishing a first communication channel between the first wireless earbud and a source device;
    receiving, by the first wireless earbud via the first communication channel, first audio data from the source device;
    receiving, by the first wireless earbud and via a second communication channel, first message data indicating that the first audio data was not received by at least one of the third wireless earbud or the fourth wireless earbud; and
    transmitting, by the first wireless earbud and via the second communication channel, a copy of the first audio data to the third wireless earbud.

2. The method of claim 1, further comprising:
    sending, by the first wireless earbud and via the second communication channel, link data associated with the first communication channel to at least the third wireless earbud; and
    synchronizing, based on the link data, channel settings associated with at least the first wireless earbud and the third wireless earbud.

3. The method of claim 2, further comprising:
    sending, by the third wireless earbud and via a third communication channel, the link data to at least the fourth wireless earbud; and
    synchronizing, based on the link data, channel settings associated with at least the third wireless earbud and the fourth wireless earbud.

4. The method of claim 2, further comprising:
    sending, by the first wireless earbud and via a third communication channel, the link data to at least the fourth wireless earbud; and
    synchronizing, based on the link data, channel settings associated with at least the first wireless earbud and the fourth wireless earbud.

5. The method of claim 1 further comprising:
    receiving, by the third wireless earbud and via a third communication channel, second message data indicating that the fourth wireless earbud did not receive the first audio data;
    sending, by the third wireless earbud and via the second communication channel, the first message data to the first wireless earbud at least partly in response to the third wireless earbud receiving the second message data; and
    sending, by the third wireless earbud and via the third communication channel, the copy of the first audio data to the fourth wireless earbud.

6. The method of claim 1, further comprising:
    receiving, by the first wireless earbud and via a third communication channel, second message data indicating that the first audio data was not received by the fourth wireless earbud; and
    transmitting, by the first wireless earbud and via the third communication channel, the copy of the first audio data to the fourth wireless earbud.

7. The method of claim 1 further comprising:
    sending, by the first wireless earbud and via the second communication channel, second message data to the third wireless earbud, the second message data indicating a status inquiry;
    sending, by the first wireless earbud via a third communication channel, third message data to the second wireless earbud, the third message data indicating a status inquiry; and
    sending, by the first wireless earbud via a fourth communication channel, fourth message data to the fourth wireless earbud, the fourth message data indicating a status inquiry.

8. An audio system comprising:
    a first pair of wireless earbuds including a first wireless earbud and a second wireless earbud; and
    a second pair of wireless earbuds including a third wireless earbud and a fourth wireless earbud;
    wherein the first wireless earbud comprises one or more processors and one or more computer-readable media storing computer-executable instructions that, when executed, cause the one or more processors to perform acts comprising:
        establishing a first communication channel between the first wireless earbud and a source device;
        receiving, via the first communication channel, first audio data from the source device;
        receiving, via a second communication channel, first message data indicating that the first audio data was not received by at least one of the third wireless earbud or the fourth wireless earbud; and
        transmitting, via the second communication channel, a copy of the first audio data to the third wireless earbud.

9. The audio system of claim 8, wherein the one or more computer-readable media further store computer-executable instructions that, when executed, cause the one or more processors to perform acts comprising:
    sending, via the second communication channel, link data associated with the first communication channel to at least the third wireless earbud; and
    synchronizing, based on the link data, channel settings associated with at least the first wireless earbud and the third wireless earbud.

10. The audio system of claim 9, wherein the third wireless earbud comprises one or more processors and one or more computer-readable media storing computer-executable instructions that, when executed, cause the one or more processors of the third wireless earbud to perform acts comprising:
    sending, via a third communication channel, the link data to at least the fourth wireless earbud; and
    synchronizing, based on the link data, channel settings associated with at least the third wireless earbud and the fourth wireless earbud.

11. The audio system of claim 9, wherein the one or more computer-readable media further store computer-executable instructions that, when executed, cause the one or more processors to perform acts comprising:
    sending, via a third communication channel, the link data to at least the fourth wireless earbud; and
    synchronizing, based on the link data, channel settings associated with at least the first wireless earbud and the fourth wireless earbud.

12. The audio system of claim 8, wherein the third wireless earbud comprises one or more processors and one or more computer-readable media storing computer-executable instructions that, when executed, cause the one or more processors of the third wireless earbud to perform acts comprising:
- receiving, via a third communication channel, second message data indicating that the fourth wireless earbud did not receive the first audio data;
- sending, via the second communication channel, the first message data to the first wireless earbud at least partly in response to the third wireless earbud receiving the second message data; and
- sending, via the third communication channel, the copy of the first audio data to the fourth wireless earbud.

13. The audio system of claim 8, wherein the one or more computer-readable media further store computer-executable instructions that, when executed, cause the one or more processors to perform acts comprising:
- receiving, via a third communication channel, second message data indicating that the first audio data was not received by the fourth wireless earbud; and
- transmitting, via the third communication channel, the copy of the first audio data to the fourth wireless earbud.

14. The audio system of claim 8, wherein the one or more computer-readable media further store computer-executable instructions that, when executed, cause the one or more processors to perform acts comprising:
- sending, via the second communication channel, second message data to the third wireless earbud, the second message data being indicating a status inquiry;
- sending, via a third communication channel, third message data to the second wireless earbud, the third message data indicating a status inquiry; and
- sending, via a fourth communication channel, fourth message data to the fourth wireless earbud, the fourth message data indicating a status inquiry.

15. A method of sharing audio data among a first pair of audio devices, which includes a first audio device and a second audio device, and a second pair of audio devices, which includes a third audio device and a fourth audio device, the method comprising:
- establishing a first communication channel between the first audio device and a source device;
- receiving, by the first audio device via the first communication channel, first audio data from the source device;
- receiving, by the first audio device and via a second communication channel, first message data indicating that the first audio data was not received by at least one of the third audio device or the fourth audio device; and
- transmitting, by the first audio device and via the second communication channel, a copy of the first audio data to the third audio device.

16. The method of claim 15, further comprising:
- sending, by the first audio device and via the second communication channel, link data associated with the first communication channel to at least the third audio device; and
- synchronizing, based on the link data, channel settings associated with at least the first audio device and the third audio device.

17. The method of claim 16, further comprising:
- sending, by the third audio device and via a third communication channel, the link data to at least the fourth audio device; and
- synchronizing, based on the link data, channel settings associated with at least the third audio device and the fourth audio device.

18. The method of claim 16, further comprising:
- sending, by the first audio device and via a third communication channel, the link data to at least the fourth audio device; and
- synchronizing, based on the link data, channel settings associated with at least the first audio device and the fourth audio device.

19. The method of claim 15, further comprising:
- receiving, by the third audio device and via a third communication channel, second message data indicating that the fourth audio device did not receive the first audio data; and
- sending, by the third audio device and via the second communication channel, the first message data to the first audio device at least partly in response to the third audio device receiving the second message data; and
- sending, by the third audio device and via the third communication channel, the copy of the first audio data to the fourth audio device.

20. The method of claim 15, further comprising:
- receiving, by the first audio device and via a third communication channel, second message data indicating that the first audio data was not received by the fourth audio device; and
- transmitting, by the first audio device and via the third communication channel, the copy of the first audio data to the fourth audio device.

* * * * *